(12) United States Patent
Katata et al.

(10) Patent No.: US 7,940,635 B2
(45) Date of Patent: May 10, 2011

(54) INFORMATION RECORDING APPARATUS AND METHOD, COMPUTER PROGRAM, AND INFORMATION RECORDING MEDIUM

(75) Inventors: Keiji Katata, Saitama (JP); Masayoshi Yoshida, Saitama (JP); Takeshi Koda, Saitama (JP)

(73) Assignee: Pioneer Corporation, Tokyo (JP)

( * ) Notice: Subject to any disclaimer, the term of this patent is extended or adjusted under 35 U.S.C. 154(b) by 448 days.

(21) Appl. No.: 12/278,713

(22) PCT Filed: Feb. 8, 2007

(86) PCT No.: PCT/JP2007/052174
§ 371 (c)(1),
(2), (4) Date: Aug. 7, 2008

(87) PCT Pub. No.: WO2007/091618
PCT Pub. Date: Aug. 16, 2007

(65) Prior Publication Data
US 2009/0028531 A1 Jan. 29, 2009

(30) Foreign Application Priority Data
Feb. 10, 2006 (JP) .................................. 2006-033845

(51) Int. Cl.
*G11B 7/24* (2006.01)
(52) U.S. Cl. .................. 369/275.3; 369/275.1; 369/30.2

(58) Field of Classification Search ............... 369/275.1, 369/275.3, 275.4, 94, 59.25, 53.1, 47.1, 30.2, 369/30.18; 386/126
See application file for complete search history.

(56) References Cited

U.S. PATENT DOCUMENTS
| 6,442,128 | B1 * | 8/2002 | Lee et al. | 369/275.1 |
| 7,643,383 | B2 * | 1/2010 | Sasaki | 369/30.2 |
| 7,801,015 | B2 * | 9/2010 | Yoshida et al. | 369/275.3 |

FOREIGN PATENT DOCUMENTS
| JP | 2000-311346 | 11/2000 |
| JP | 2001-023237 | 1/2001 |
| JP | 2001-057030 | 2/2001 |
| JP | 2005-011482 | 1/2005 |
| JP | 2005-093032 | 4/2005 |
| WO | 2005-086162 | 9/2005 |

OTHER PUBLICATIONS
International Search Report PCT/JP2007/052174, Mar. 1, 2007.

* cited by examiner

*Primary Examiner* — Ali Neyzari
(74) *Attorney, Agent, or Firm* — Young & Thompson

(57) ABSTRACT

An information recording apparatus (200) is provided with: a first recording device (354) for recording user data into a user data area (105, 115) provided for an information recording medium (100), with a data area attribute added; and a second recording device (354) for recording a marker (108) following an end edge portion of the recorded user data, with a predetermined flag bit set to a first value and with the data area attribute added, the flag bit indicating at least whether or not the marker is recorded.

13 Claims, 18 Drawing Sheets

[FIG. 1]
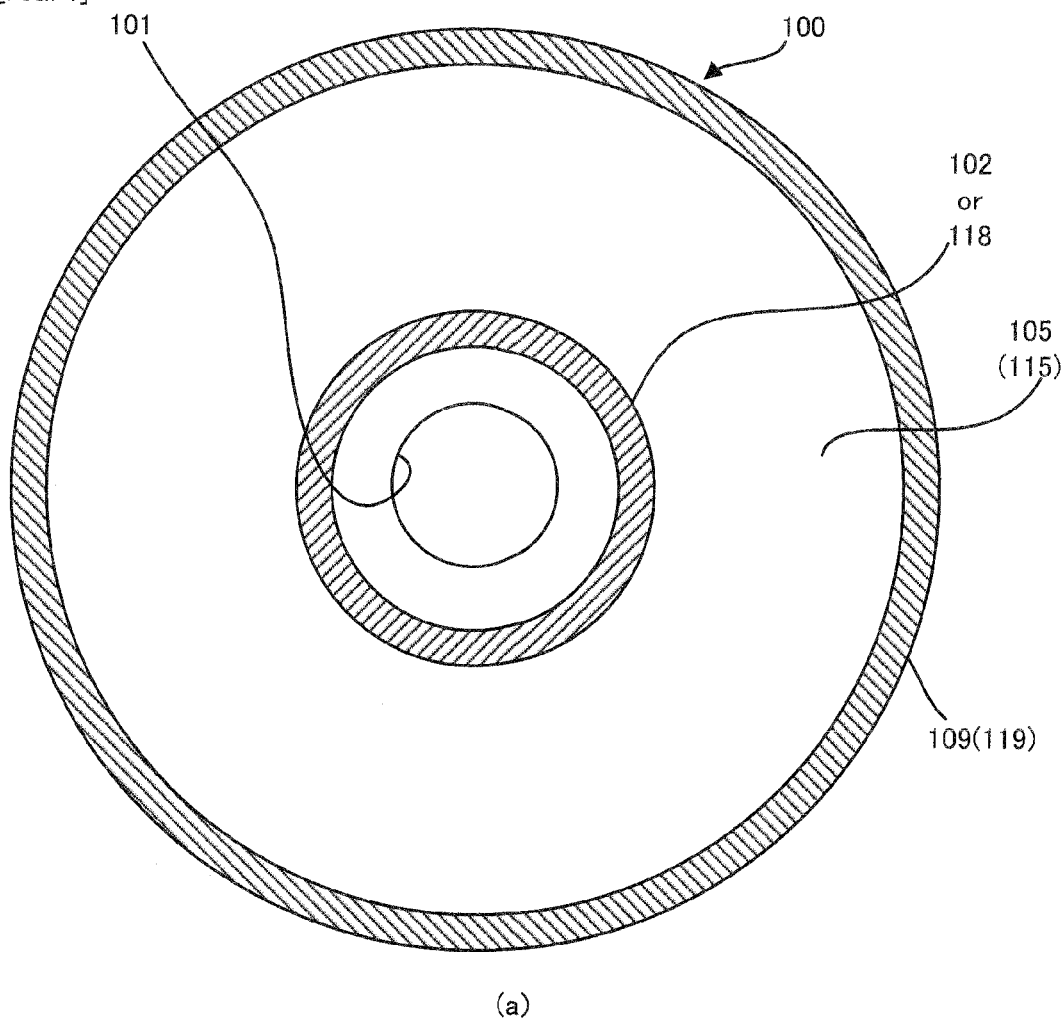
(a)
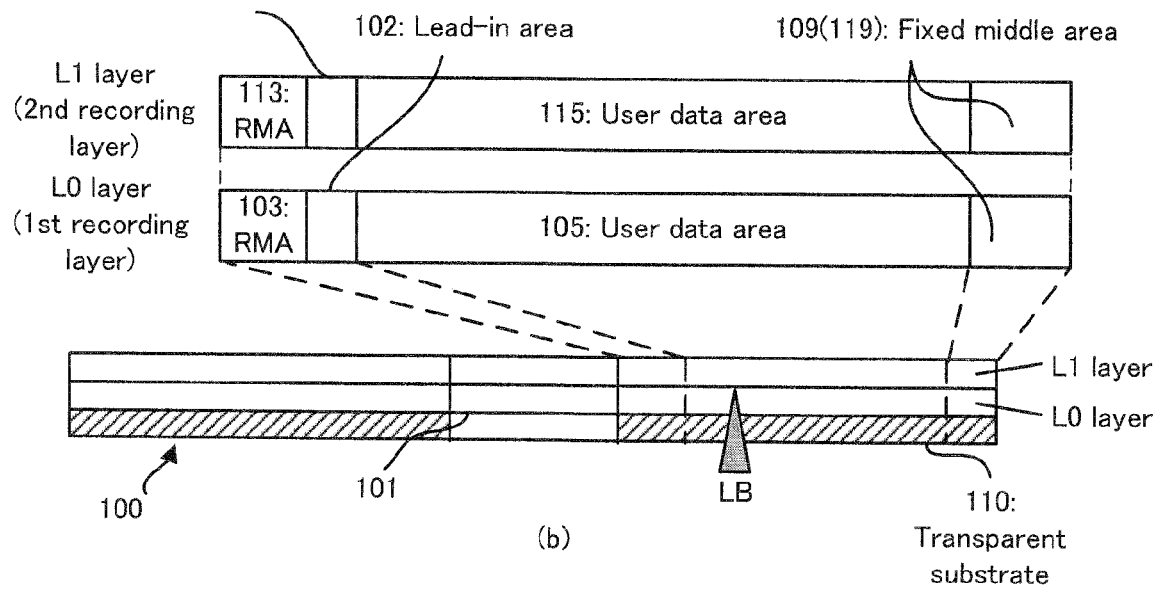
(b)

[FIG. 2]
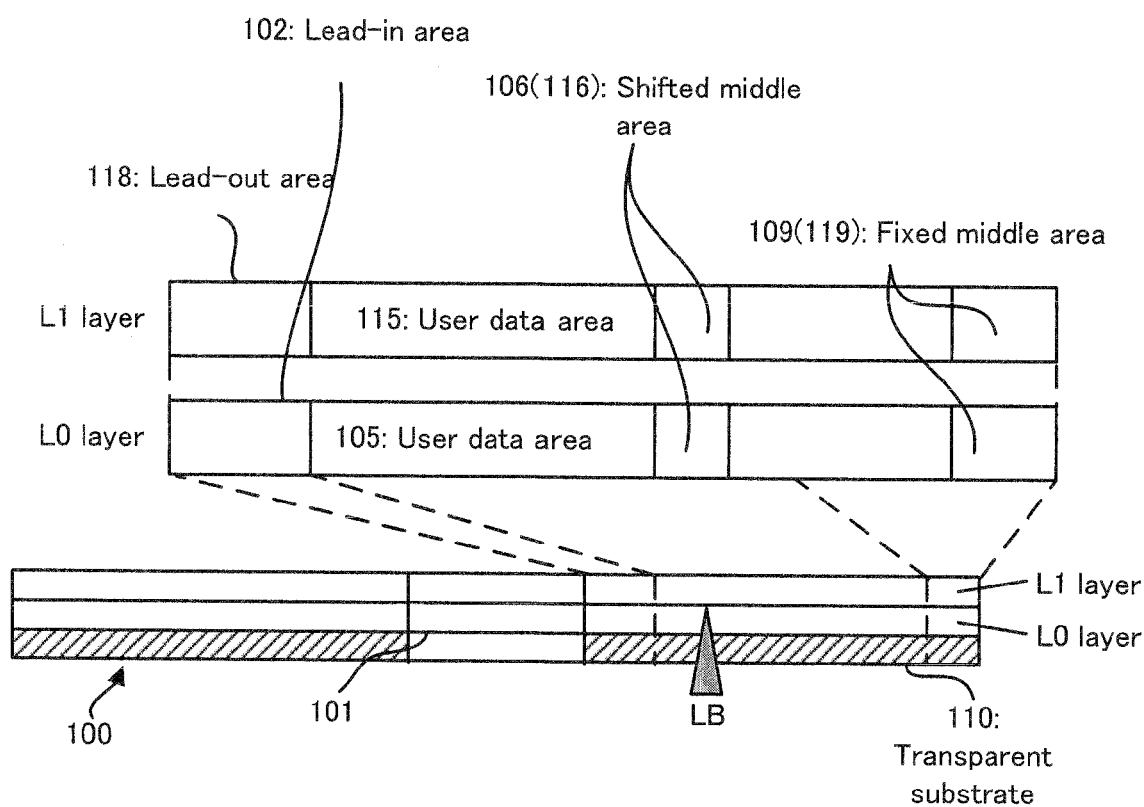

[FIG. 3]
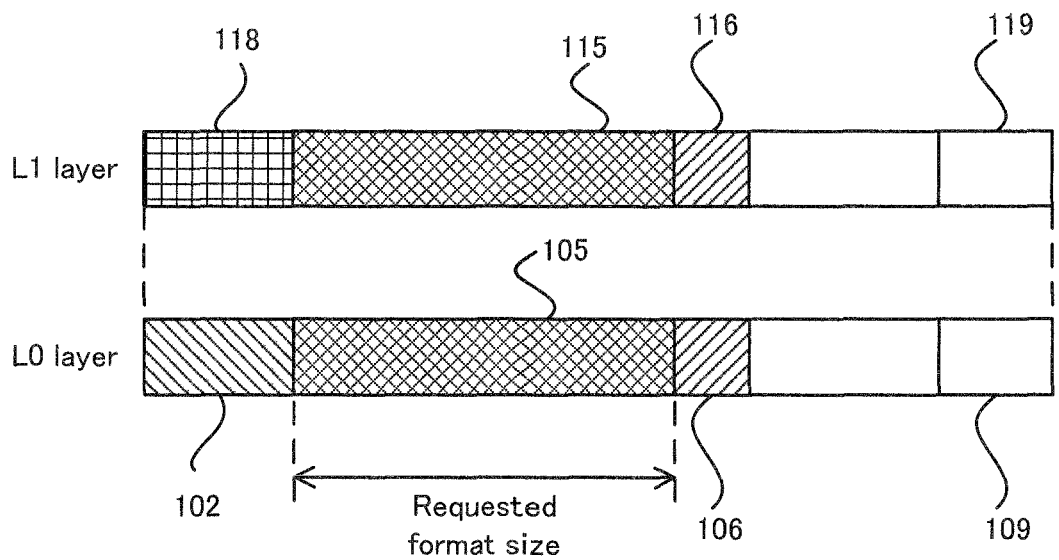
(a)
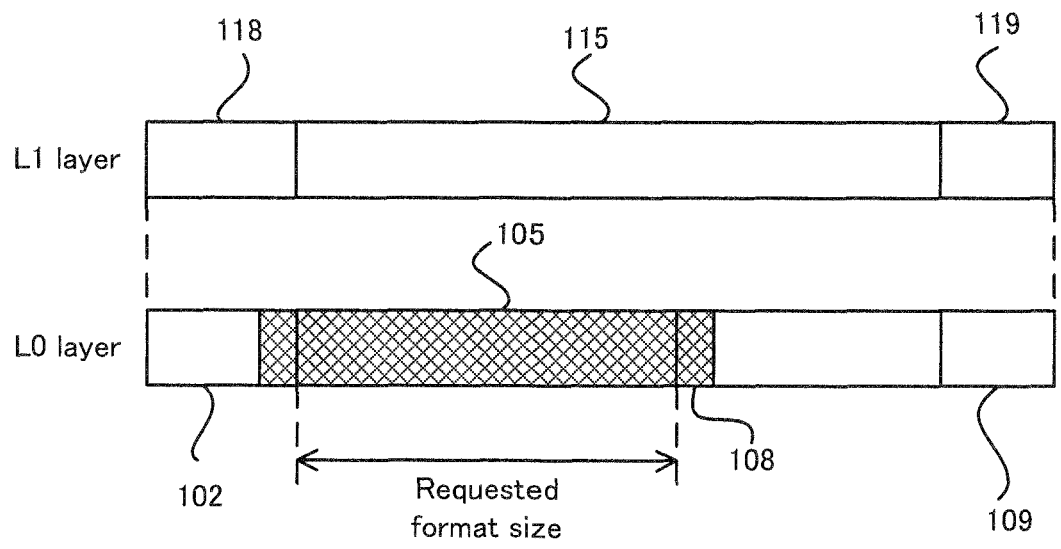
(b)

[FIG. 4]
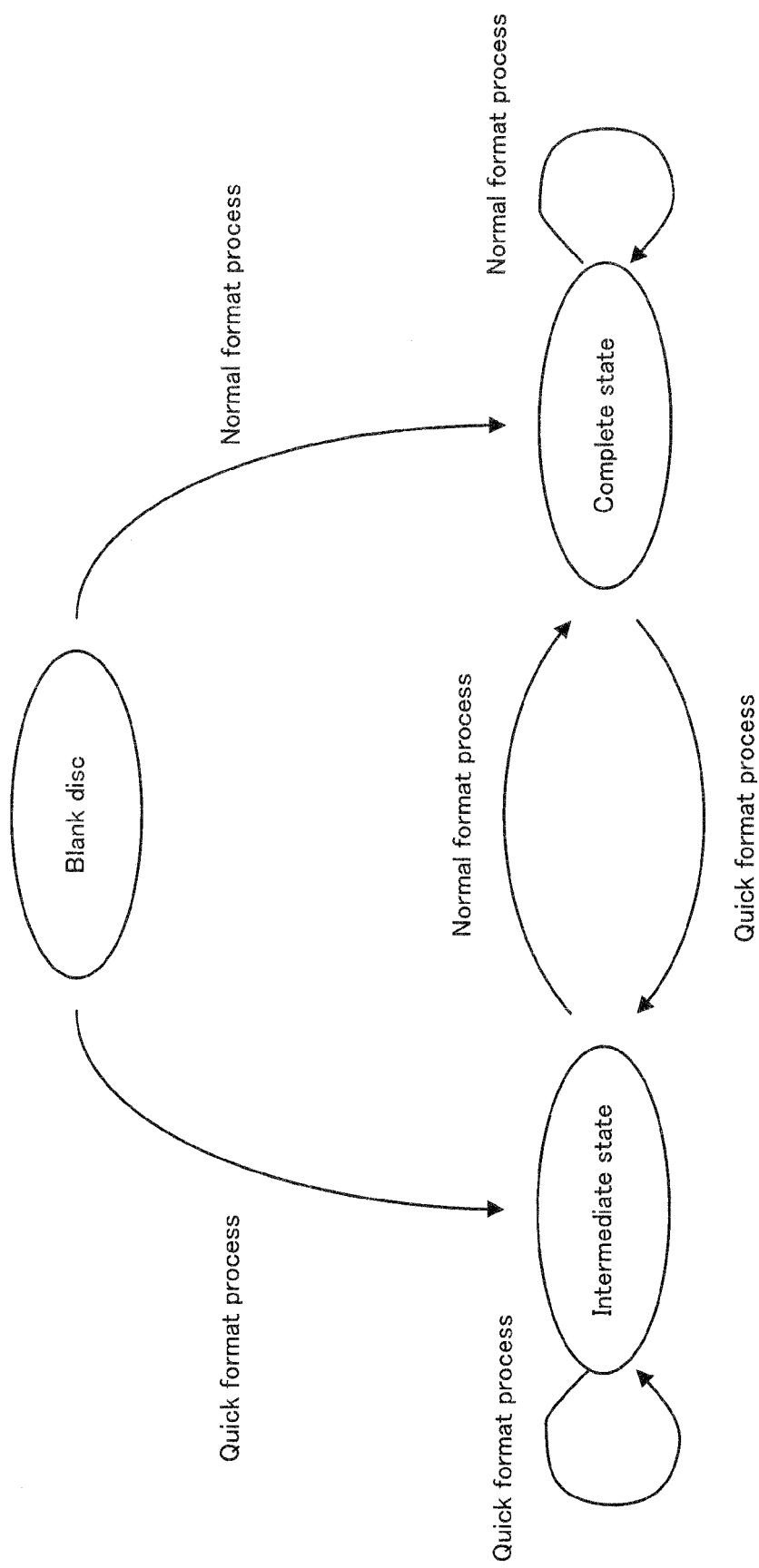

[FIG. 5]
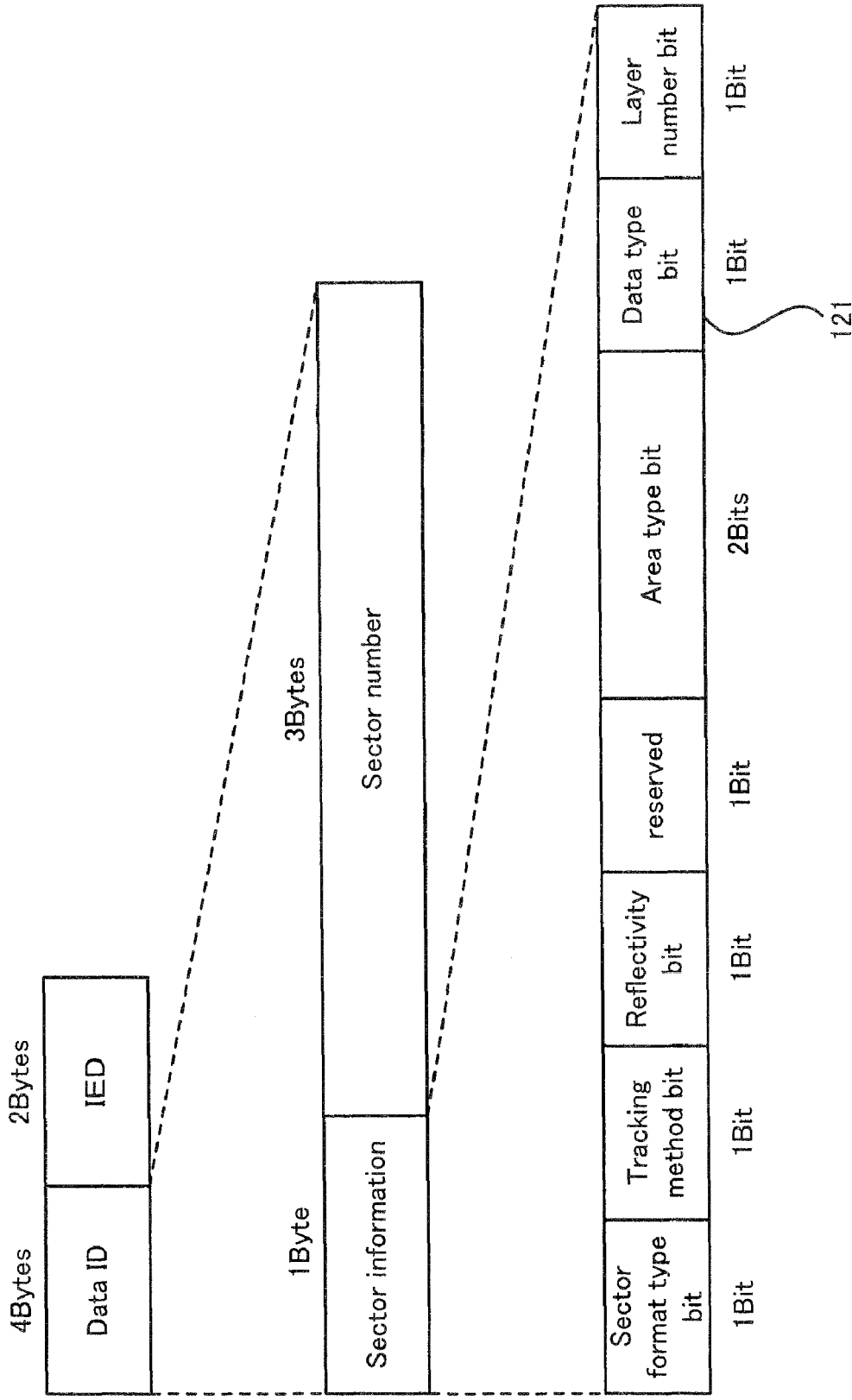

[FIG. 6]
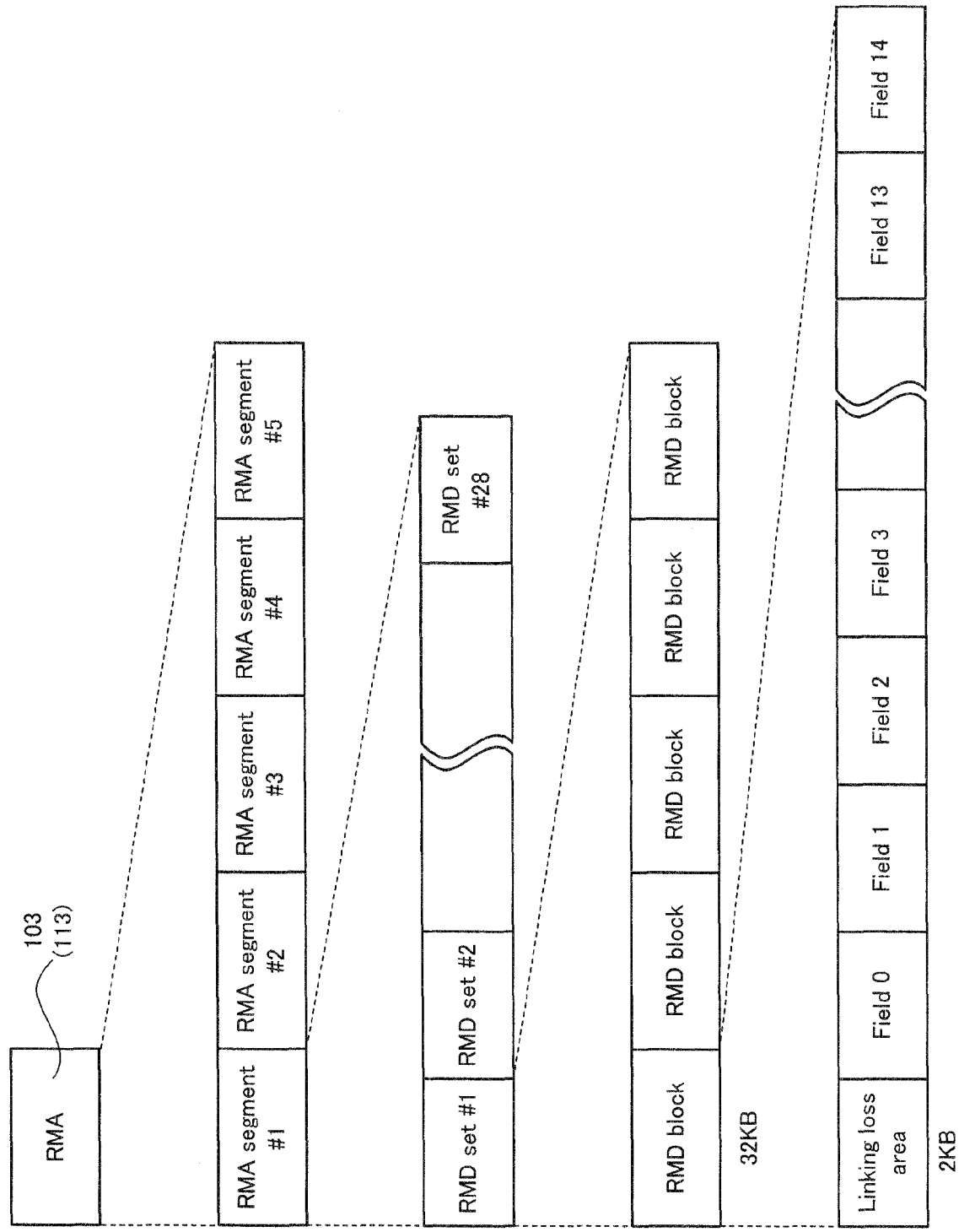

[FIG. 7]

| Sector number | Field number | Format 2 RMD | Format 3 RMD |
|---|---|---|---|
| 0 | Linking loss area | Linking loss area | |
| 1 | 0 | Common information | |
| 2 | 1 | Pointer to RMD set | OPC related information |
| 3 | 2 | | User specific data |
| 4 | 3 | | Recording status information |
| 5 | 4 | | |
| 6 | 5 | | |
| 7 | 6 | | |
| 8 | 7 | | |
| 9 | 8 | Reserved area | Defect status bitmap |
| 10 | 9 | | |
| 11 | 10 | | |
| 12 | 11 | | |
| 13 | 12 | | |
| 14 | 13 | | Drive specific information |
| 15 | 14 | | Disc testing area information |

[FIG. 8]

| BP | content | Number of bytes |
|---|---|---|
| 0 to 1 | RMD format | 2 bytes |
| 2 | Disc status | 1 byte |
| 3 | reserved | 1 byte |
| 4 to 21 | Unique disc ID | 18 bytes |
| 22 to 85 | Copy of pre-pit information | 64 bytes |
| 86 to 89 | Start sector number of shifted middle area | 4 bytes |
| 90 | Pre-recorded/embossed information code | 1 byte |
| 91 | reserved | 1 byte |
| 92 to 95 | End address of pre-recorded/embossed lead-in area | 4 bytes |
| 96 to 99 | End address of pre-recorded/embossed middle area (L0 layer) | 4 bytes |
| 100 to 103 | Start address of pre-recorded/embossed middle area (L1 layer) | 4 bytes |
| 104 to 107 | Start address of pre-recorded/embossed lead-out area | 4 bytes |
| 108 to 127 | reserved | 20 bytes |
| 128 | RBG information | 1 byte |
| 129 to 2047 | reserved | 1919 bytes |

[FIG. 9]

| BP | Content | Number of bytes |
|---|---|---|
| 0 | Format operation code | 1 byte |
| 1 | Reserved | 1 byte |
| 2 to 5 | Format information #1 | 4 bytes |
| 6 to 9 | Format information #2 | 4 bytes |
| 10 to 255 | Reserved | 54 bytes |
| 256 to 257 | Last Rzone number | 2 bytes |
| 258 to 261 | Start sector number of RZone | 4 bytes |
| 262 to 265 | End sector number of RZone | 4 bytes |
| 266 to 511 | Reserved | 4 bytes |
| 512 to 515 | Layer jump address on L0 layer | 4 bytes |
| 516 to 519 | Last recorded address | 4 bytes |
| 520 to 523 | Previous layer jump address on L0 layer | 4 bytes |
| 524 to 525 | Jump interval | 2 bytes |
| 526 to 527 | Reserved | 2 bytes |
| 528 to 531 | Outermost address of formatted area on L0 layer | 4 bytes |
| 532 to 535 | Outermost address of innermost formatted area on L1 layer | 4 bytes |
| 536 to 539 | Outermost address of innermost recorded area on L1 layer | 4 bytes |
| 540 to 2047 | Reserved | 1508 bytes |

[FIG. 10]
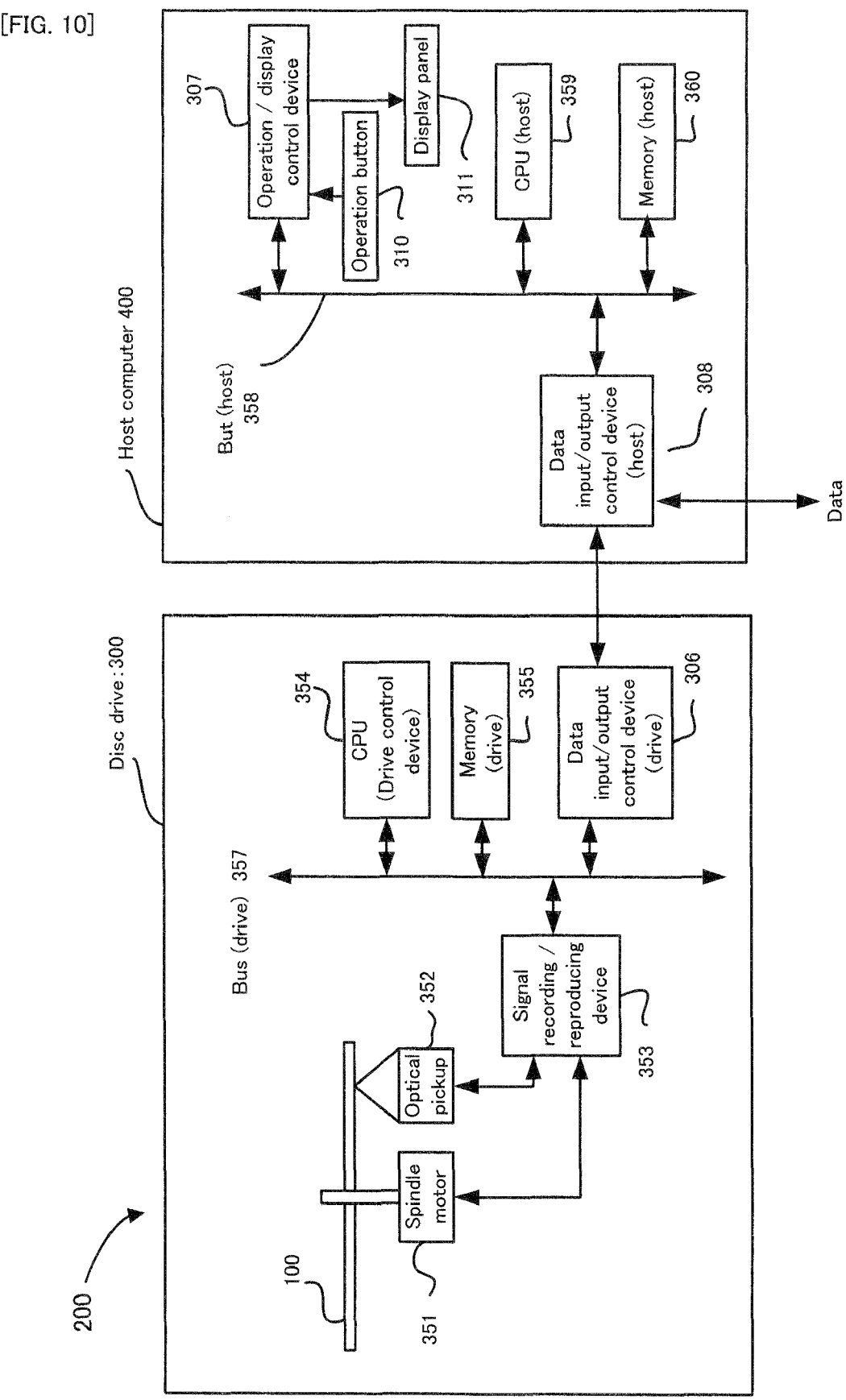

[FIG. 11]
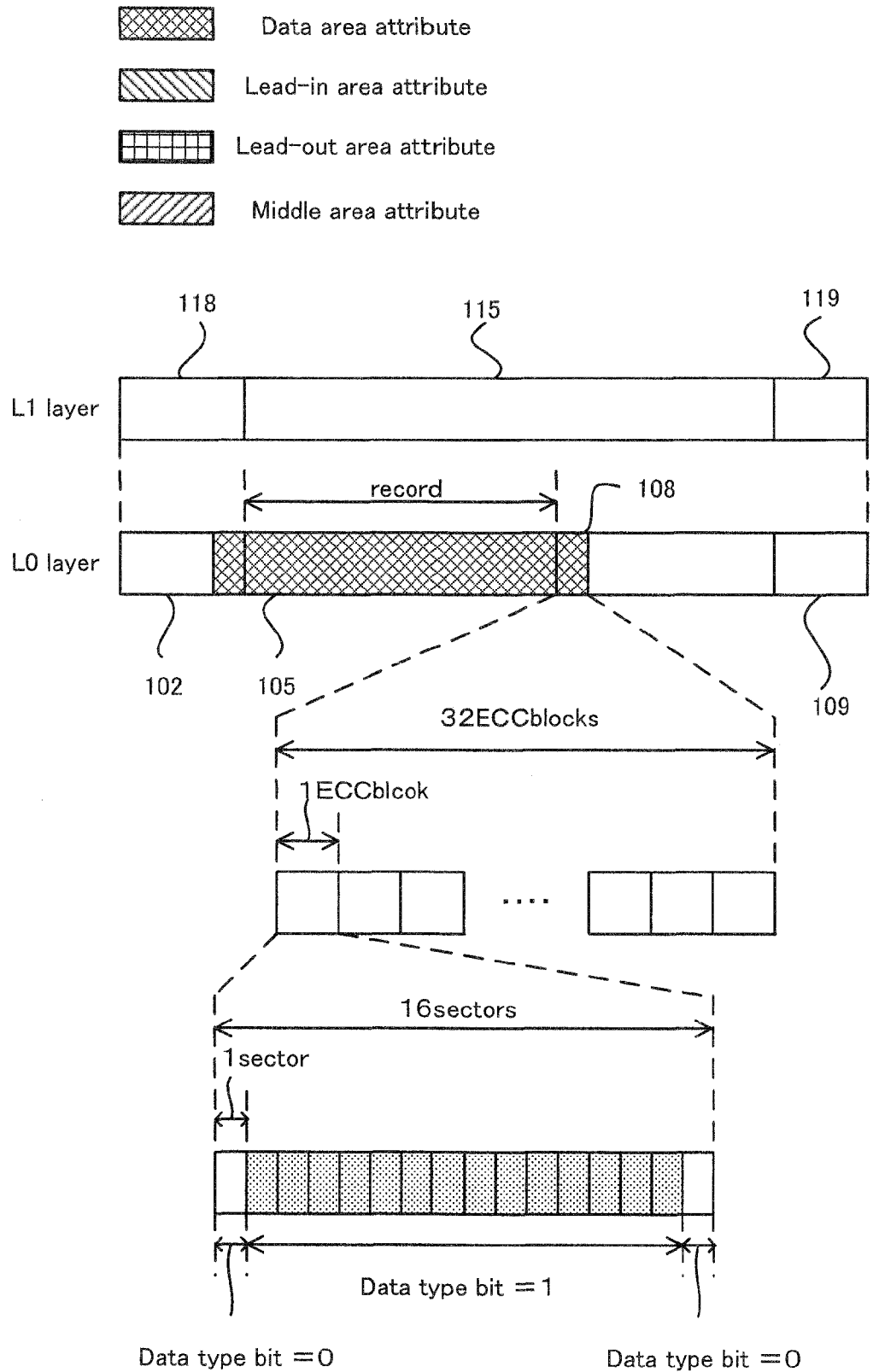

[FIG. 12]
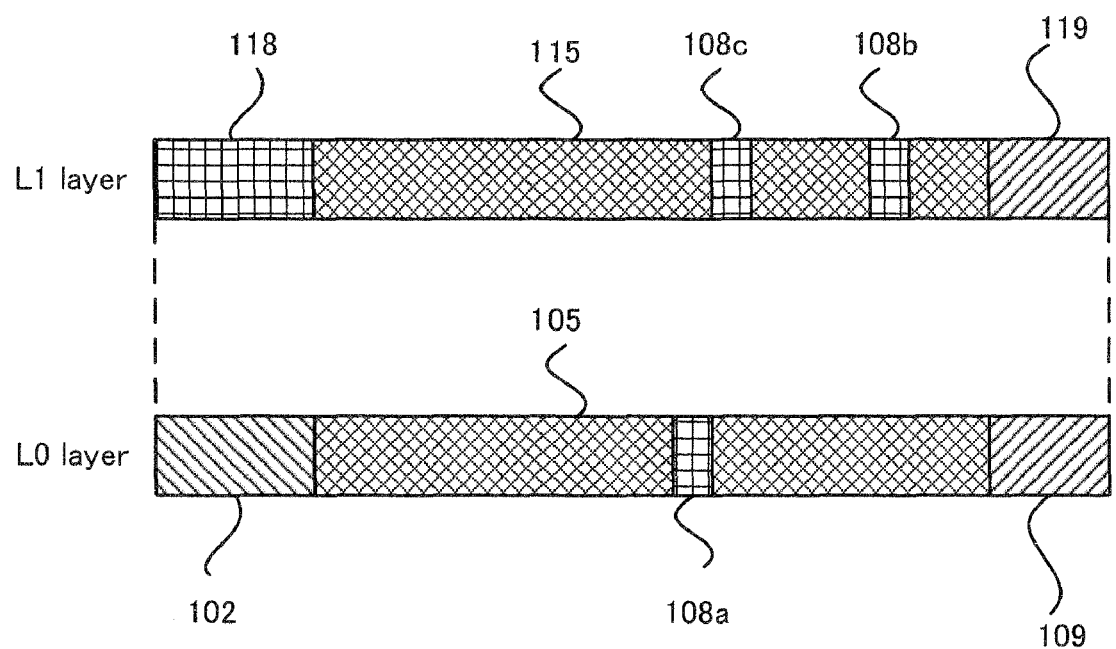

[FIG. 13]
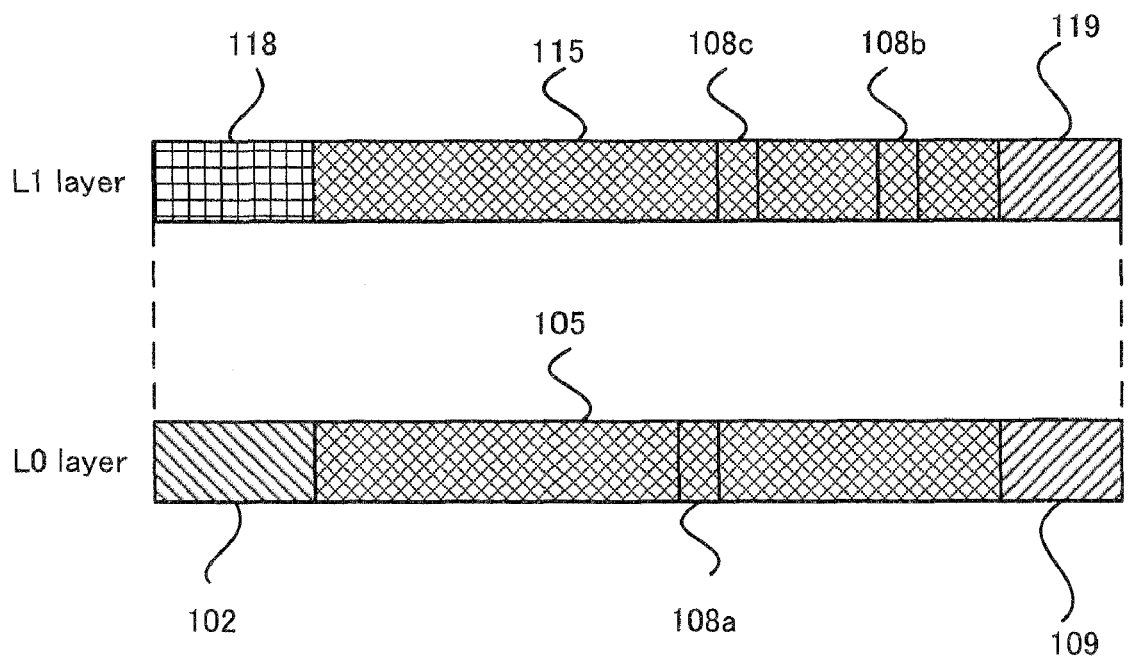

[FIG. 14]
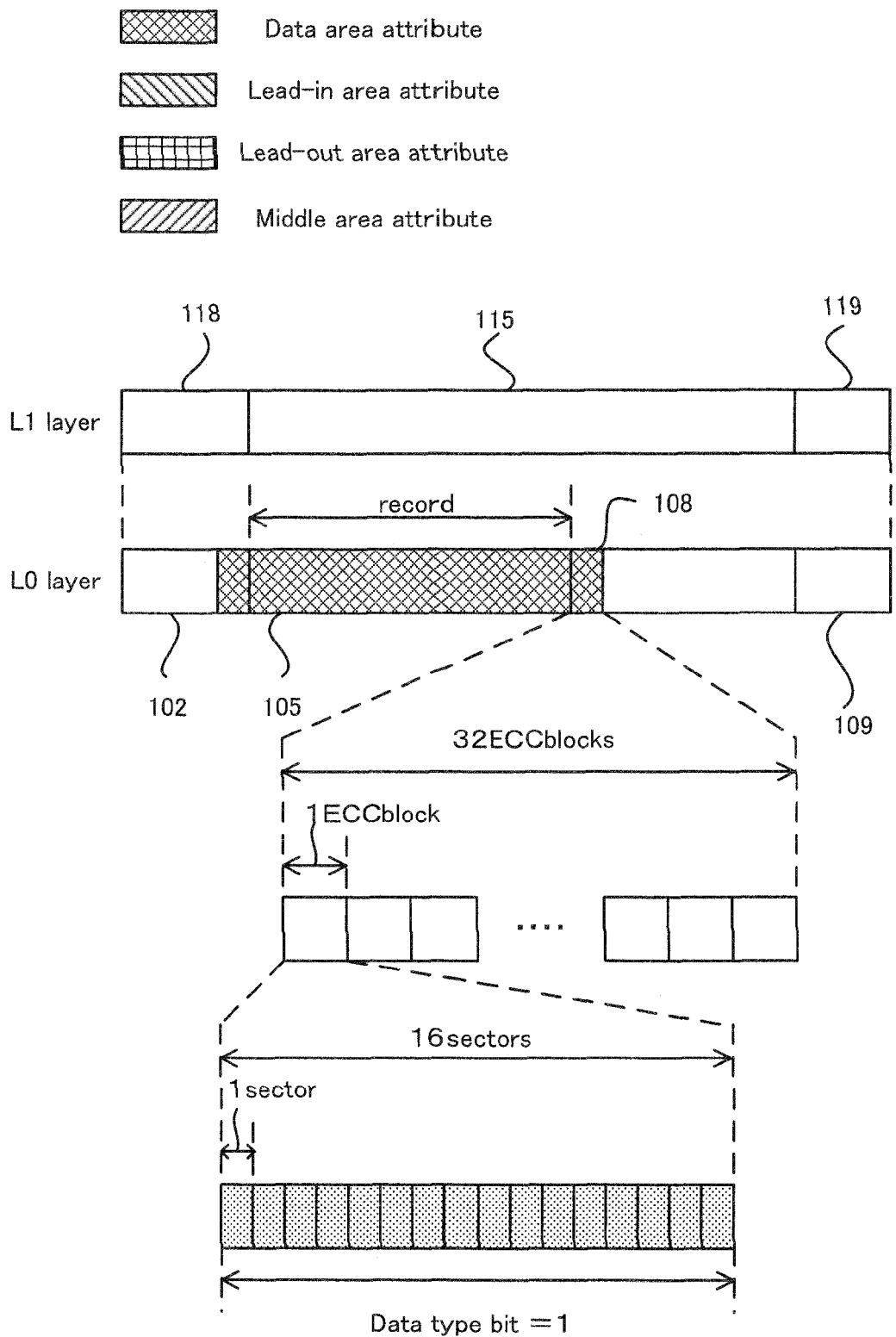

[FIG. 15]
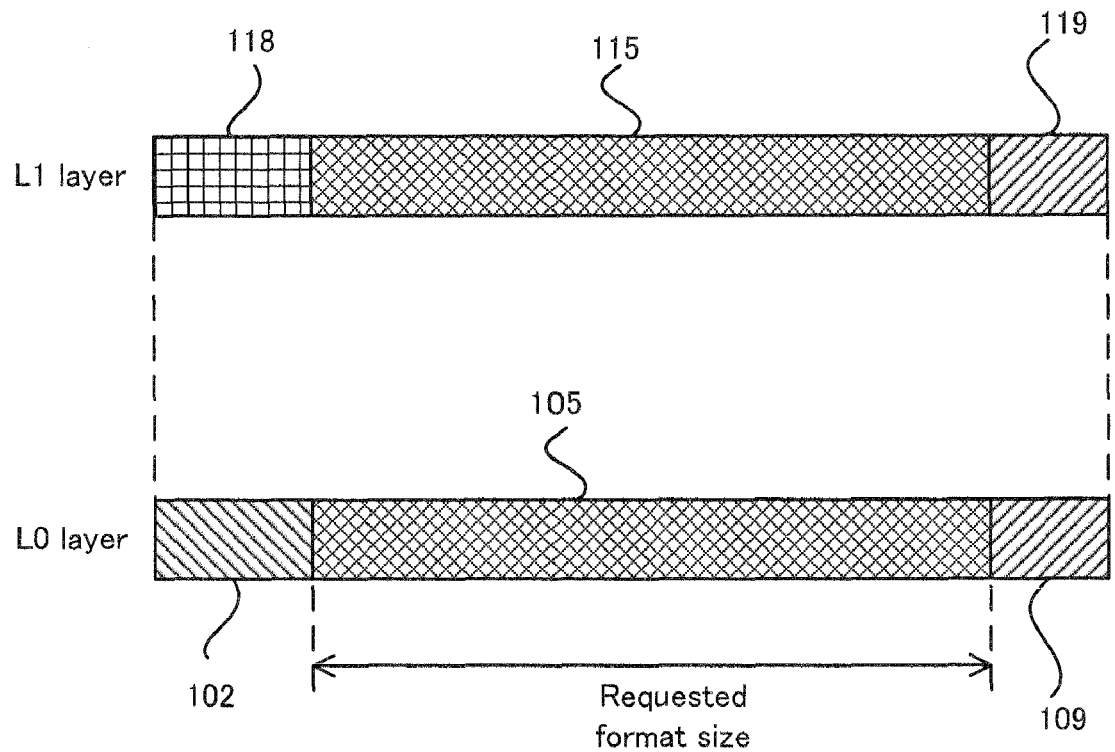

[FIG. 16]
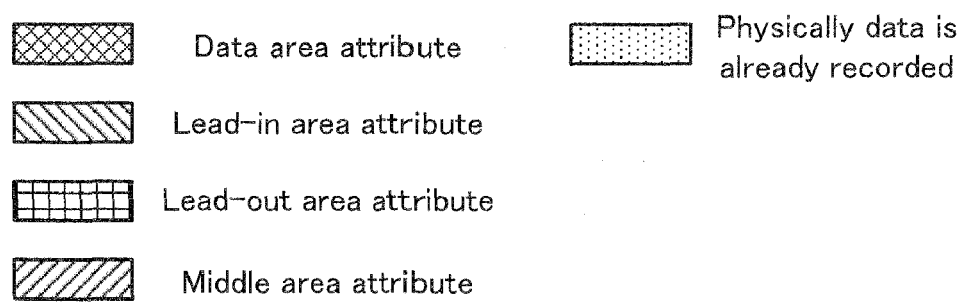
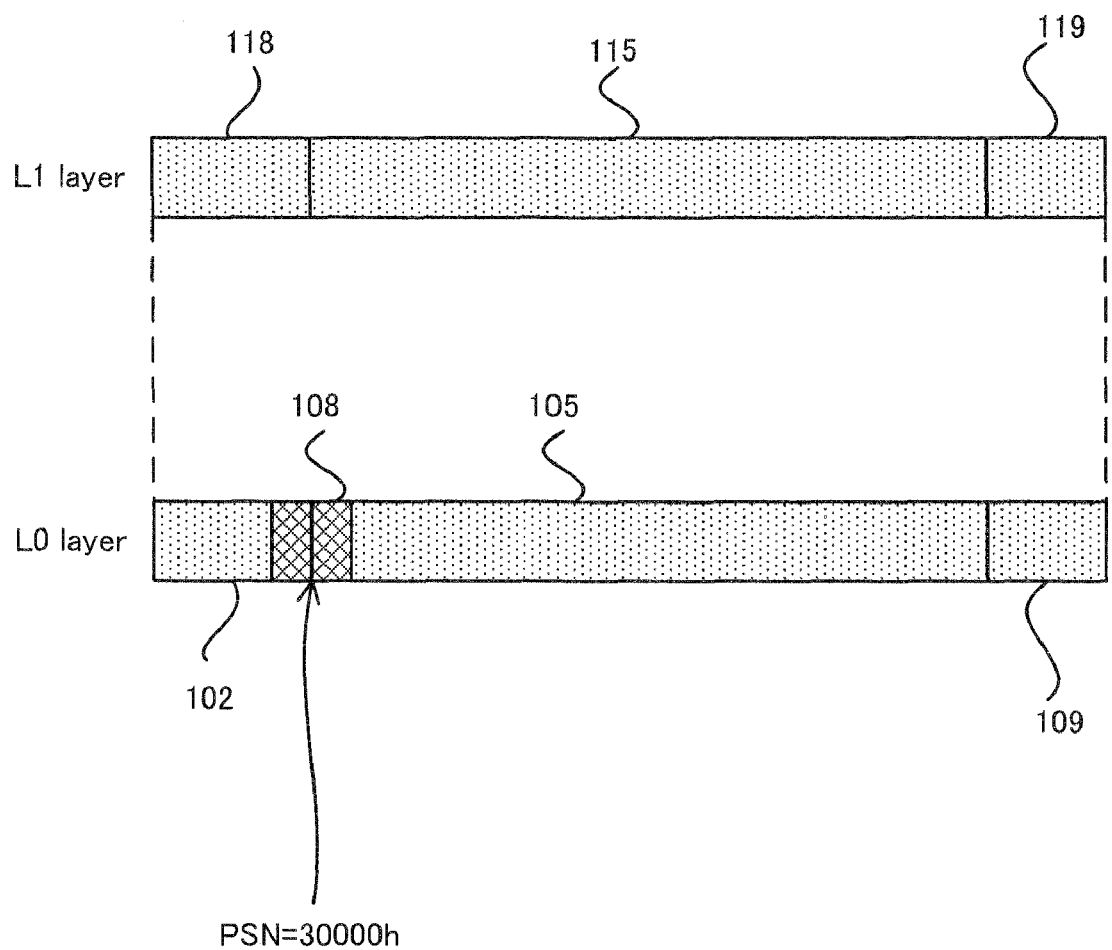

[FIG. 17]
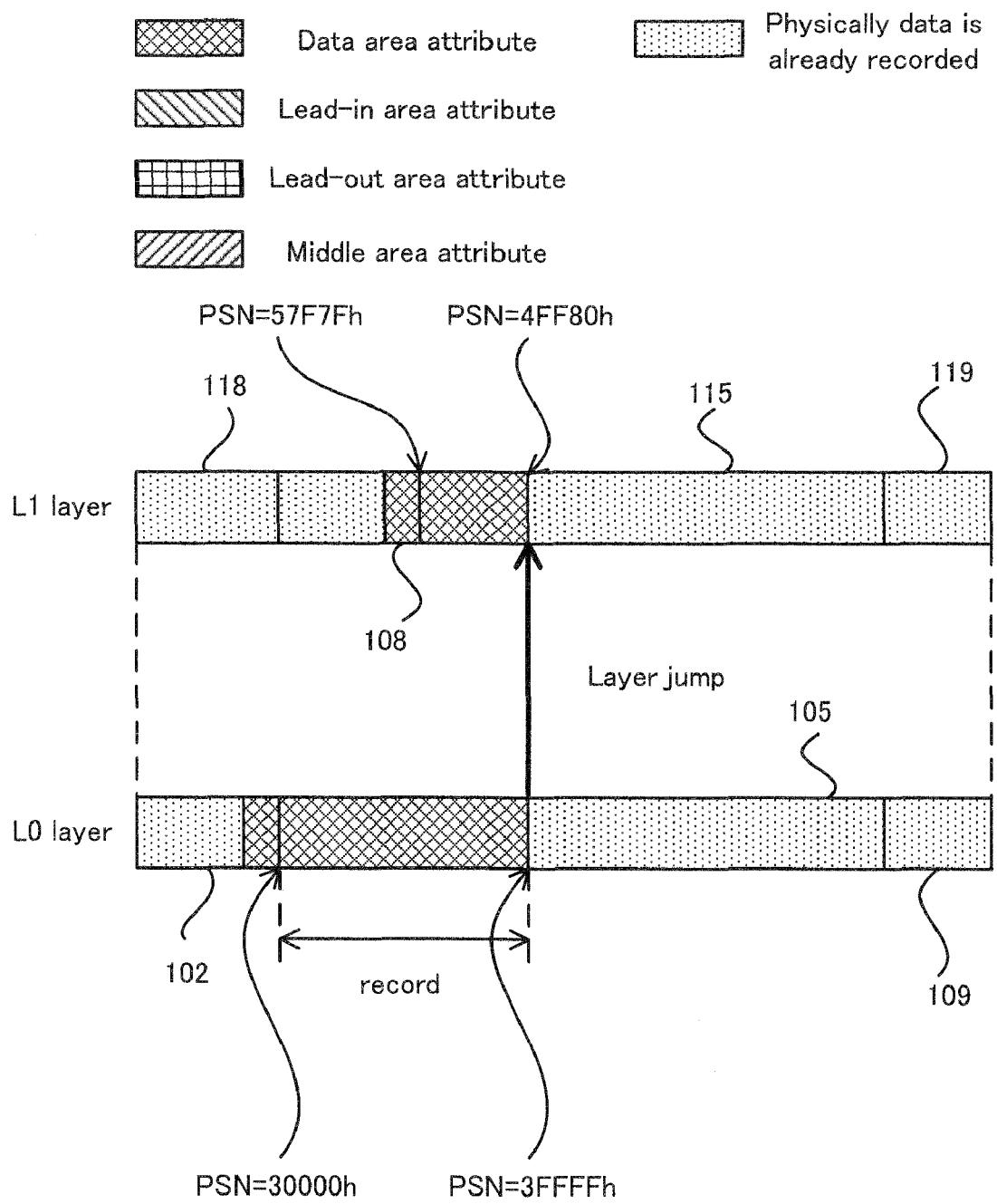

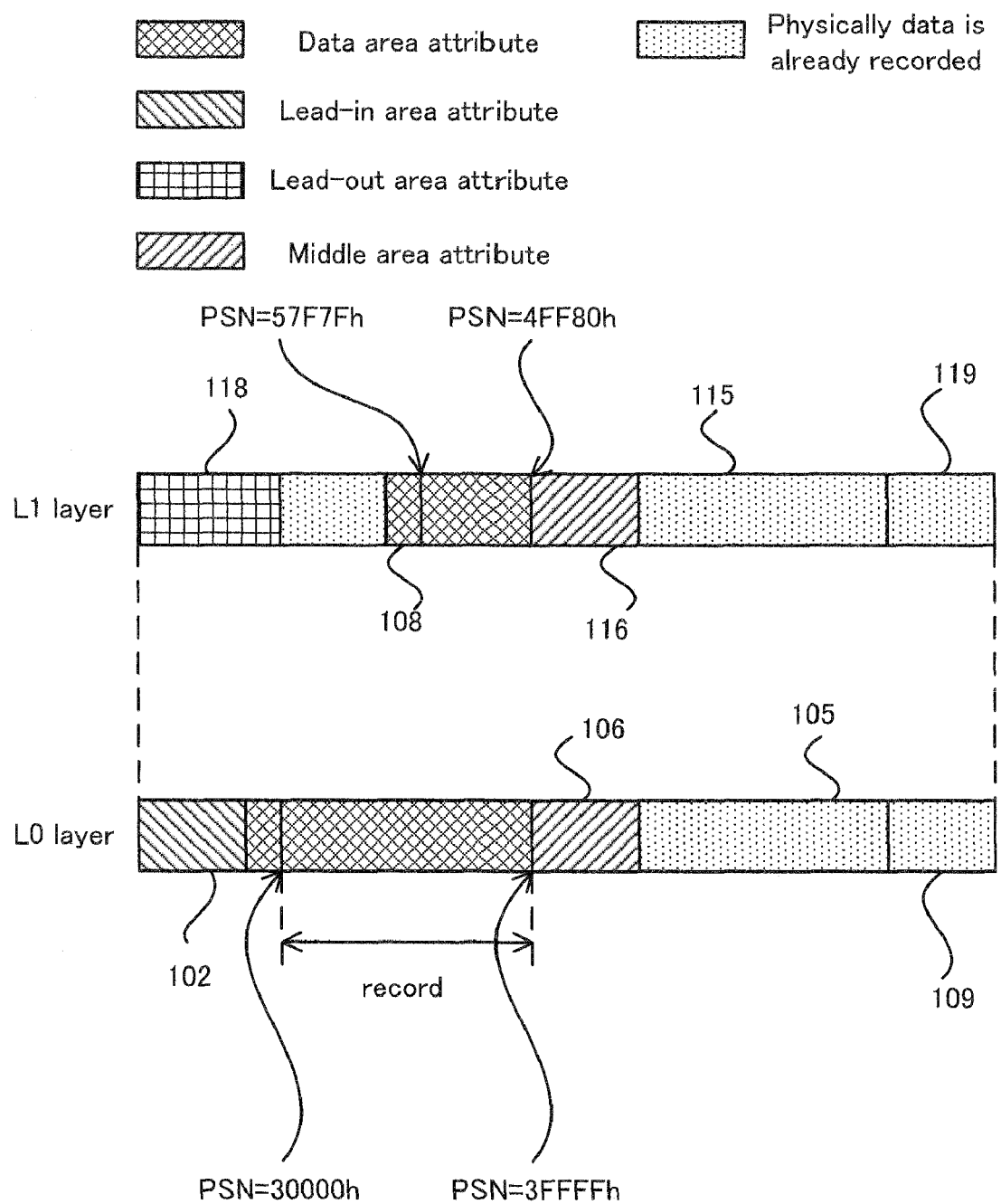
[FIG. 18]

INFORMATION RECORDING APPARATUS AND METHOD, COMPUTER PROGRAM, AND INFORMATION RECORDING MEDIUM

TECHNICAL FIELD

The present invention relates to an information recording medium, such as a DVD (Digital Versatile Disc), an information recording apparatus and an information recording method, such as a DVD recorder, and a computer program which makes a computer function as such an information recording apparatus.

BACKGROUND ART

In an information recording medium, such as a DVD-ROM (DVD-Read Only Memory), a DVD-R (DVD-Recordable), and a BD-ROM (Blu-ray Disc-ROM), for example, as described in patent documents 1 and 2, etc., there is also developed an information recording medium, such as an optical disc, of a multilayer type or dual layer type, in which a plurality of recording layers are laminated or stacked on the same substrate. Then, if recording is performed with respect to a DVD-R of the dual layer type, i.e., of a two-layer type, out of the two-layer type optical disc, an information recording apparatus, such as a DVD recorder, focuses laser light for recording on a recording layer located on the front (i.e. on the closer side to an optical pickup) viewed from a laser light irradiation side (hereinafter referred to as an "L0 layer", as occasion demands), to thereby record information into the L0 layer in a heat change recording method (in other words, an irreversible change recording method). Moreover, it focuses the laser light for recording on a recording layer located on the rear (i.e. on the farther side to the optical pickup) viewed from the laser light irradiation side (hereinafter referred to as an "L1 layer", as occasion demands), through the L0 layer, to thereby record information into the L1 layer in the heat change recording method.

Patent document 1: Japanese Patent Application Laid Open NO. 2000-311346

Patent document 2: Japanese Patent Application Laid Open NO. 2001-23237

DISCLOSURE OF INVENTION

Subject to be Solved by the Invention

Here, in recording user data, it is determined according to the standard that an intermediate marker having a lead-out area attribute is recorded following the end edge portion of the recorded data. The intermediate marker is used to detect the end edge portion of the recorded user data. Specifically, if a seek operation is performed near the intermediate marker with laser light irradiated, it is possible to preferably recognize a boundary between the intermediate marker and the already recorded user data. In particular, in case that RMD (Recording Management Data) in which the address of the end edge portion of the recorded user data is recorded cannot be read due to defects or the like, the content of the RMD can be restored by using the intermediate marker.

However, if a quick format process to logically delete the user data recorded on the information recording medium is performed a plurality of times, the intermediate marker recorded before the quick format process and the intermediate marker newly recorded after the quick format process exist on the information recording medium. Namely, the plurality of intermediate markers exist on the information recording medium. In this case, even if the boundary between the intermediate marker and the already recorded user data can be recognized as described above, it is difficult or impossible to judge whether or not the boundary is the true end edge portion of the recorded user data.

In addition, the intermediate marker has the lead-out area attribute. Thus, if a read-only type information reproducing apparatus detects the intermediate marker having the lead-out area attribute, there is a possibility to misunderstand such that the lead-out area is irradiated with the laser light. This has such a technical problem that a preferable search operation cannot be performed even in a user data area. As the number of the intermediate markers existing in the user data area increases more, this becomes more apparent.

It is therefore an object of the present invention to provide an information recording apparatus and an information recording method capable of maintaining a preferable recording operation and a preferable reproduction operation while recording a marker, such as an intermediate marker, for example, a computer program which makes a computer function as such an information recording apparatus, and an information recording medium.

Means for Solving the Subject (Information Recording Apparatus)

The above object of the present invention can be achieved by an information recording apparatus provided with: a first recording device for recording user data into a user data area provided for an information recording medium, with a data area attribute added, the data area attribute indicating that the user data is recorded; and a second recording device for recording a marker (e.g. an intermediate marker, described later) following an end edge portion of the recorded user data, with a predetermined flag bit (e.g. a data type bit, described later) set to a first value (e.g. "1") and with the data area attribute added, the marker indicating that a position of the marker is the end edge portion of the recorded user data, the flag bit indicating at least whether or not the marker is recorded.

According to the information recording apparatus of the present invention, by the operation of the first recording device, the user data including various information, such as video information and audio information, for example, can be recorded into the user data area provided on the information recording medium. At this time, the first recording device records the user data while adding the data area attribute indicating that the recorded data is the user data.

Particularly in the present invention, by the operation of the second recording device, in the end edge portion of the already recorded user data (in other words, the end edge portion of the area portion in which the user data is already recorded, and the area portion in which the recording of the user data is to be started), the marker indicating that the position is the end edge portion is recorded. Incidentally, the "already recorded user data" indicates the user data which is already logically recorded (i.e. the user data whose recording is managed by "recording management information"). This marker is recorded while the data area attribute which is same attribute of the user data is added. Moreover, the marker is recorded in such a condition that the flag bit is set to the first value (e.g. a valid or effective value), wherein the flag bit indicates at least whether or not the data to be recorded is the marker (in other words, indicates at least whether or not the position in which the marker is recorded is the end edge portion of the user data). Incidentally, the flag bit does not always indicate whether or not the data to be recorded is the marker, and it is only necessary to indicate whether or not the data to be recorded is the marker, for example, in at least one portion on the information recording medium (specifically, for example, in at least the user data area). In another portion on the information recording medium, the flag bit may be used for another application.

As described above, by setting the flag bit to the first value, the information recording apparatus can preferably recognize whether or not the data to be recorded is the marker. Thus, it is possible to preferably recognize the end edge portion of the already recorded user data by using the marker. Namely, the marker recorded by the information recording apparatus in the present invention can preferably function as the marker.

Moreover, the data area attribute which is same attribute of the user data is added to the marker. Thus, while the marker can function as the marker, there is no more possibility to misunderstand such that the marker is a buffer area, such as a lead-out area, by detecting the marker, for example. In particular, a read-only type information reproducing apparatus for reproducing the user data recorded on the information recording medium is provided with a fail safe mechanism of getting out of the buffer area if detecting the buffer area in the middle of searching on the information recording medium. In this case, there is no possibility to misunderstand such that the marker is the buffer area, which reduces or eliminates such a possibility that the fail safe mechanism mistakenly functions in the user data area. In other words, the information reproducing apparatus can preferably operates the fail safe mechanism by using the buffer area, such as a lead-in area, a lead-out area, and a middle area. As described above, the attribute other than the data area attribute is not added to the marker. Thus, even if the marker is recorded in the user data area, it is possible to preferably avoid such a disadvantage that an unexpected operation is performed by detecting the marker.

In addition, if a format process is performed a plurality of times, a plurality of markers (specifically, an old marker recorded before the format process, and a new marker newly recorded after the format process) can exist on the information recording medium. Even in this case, it is possible to preferably avoid such a disadvantage that an unexpected operation is performed by detecting the marker. Thus, it is also possible to receive such an advantage that it is unnecessary to delete the marker at each time of the format process, for example. This leads to the advantage that the operation load of the information recording apparatus can be reduced. Moreover, the advantage that it is unnecessary to delete the marker is the advantage that can be received as in the case where the marker is unexpectedly left on the information recording medium due to an abnormal operation (e.g. power shutdown, etc.) which could happen on the information recording apparatus.

Consequently, according to the information recording apparatus of the present invention, it is possible to maintain the preferable recording operation and the preferable reproduction operation while the marker, such as an intermediate marker, for example, is recorded.

In one aspect of the information recording apparatus of the present invention, the marker includes a plurality of unit blocks (e.g. 32 ECC blocks, as described later) each of which includes a plurality of unit sectors (e.g. 16 sectors, as described later), the data area attribute is added to each of the plurality of unit sectors, the flag bit is provided for each of the plurality of unit sectors, and the second recording device records the marker in which the flag bit provided for at least one portion of the plurality of unit sectors is set to the first value.

According to this aspect, even the information recording apparatus which does not effectively use all the plurality of unit sectors included in the unit block, for example (in other words, which selectively uses one portion thereof can record the marker in the above-mentioned aspect. As a result, it is possible to preferably receive the above-mentioned various benefits.

In an aspect of the information recording apparatus in which the marker in which the flag bit, provided for at least one portion of the plurality of unit sectors, is set to the first value, as described above, the second recording device may record the marker in which the flag bit provided for a unit sector located in each of a start edge portion and an end edge portion of each of the plurality of unit blocks, out of the plurality of unit sectors, is set to a second value different from the first value and in which the flag bit provided for a unit sector other than the unit sector located in each of the start edge portion and the end edge portion of each of the plurality of unit blocks is set to the first value.

By virtue of such construction, even the information recording apparatus which does not effectively use all the plurality of unit sectors included in the unit block, for example (e.g., the information recording apparatus which does not use the first and sixteenth sectors out of the 16 sectors included in 1 ECC block, as described later) can record the marker in the above-mentioned aspect. As a result, it is possible to preferably receive the above-mentioned various benefits.

In another aspect of the information recording apparatus of the present invention, the marker includes a plurality of unit blocks each of which includes a plurality of unit sectors, the data area attribute is added to each of the plurality of unit sectors, the flag bit is provided for each of the plurality of unit sectors, and the second recording device records the marker in which the flag bit provided for each of the plurality of unit sectors is set to the first value.

According to this aspect, even the information recording apparatus which effectively uses all the plurality of unit sectors included in the unit block, for example, can record the marker in the above-mentioned aspect. As a result, it is possible to preferably receive the above-mentioned various benefits.

In another aspect of the information recording apparatus of the present invention, the first recording device records the user data in which the flag bit is set to a second value (e.g. "0") different from the first value.

According to this aspect, it is possible to preferably distinguish the marker and the user data to which the same data attributes are added, by referring to the flag bit. By this, an information recording/reproducing apparatus can preferably recognize the marker recorded in the user data area together with the user data. As a result, it is possible to preferably receive the above-mentioned various benefits.

In another aspect of the information recording apparatus of the present invention, the flag bit can be read by the information recording apparatus, and the flag bit cannot be read by a read-only type information reproducing apparatus for reproducing the user data recorded on the information recording medium or the flag bit is disregarded even if it is read.

According to this aspect, by the information recording apparatus for performing the recording operation by using the marker, it is possible to preferably recognize the marker by referring to the flag. And by the read-only type information reproducing apparatus for performing the reproduction operation without using the marker, it is possible to preferably operate the fail safe mechanism, regardless of the presence of the marker.

In another aspect of the information recording apparatus of the present invention, the flag bit is a data type bit indicating at least whether or not linking data is recorded.

According to this aspect, by using the data type bit, which is already defined for a DVD-RW or the like, as one specific example of the information recording medium, for example, for new application, it is possible to receive the above-mentioned various benefits without providing a new special flag.

In another aspect of the information recording apparatus of the present invention, in a first area portion in which the user data is recorded, the flag bit indicates whether or not a position of the flag bit is the end edge portion of the user data, and in a second area portion other than the first area portion in which the user data is recorded, the flag bit indicates whether or not linking data is recorded.

According to this aspect, the application the flag bit can be changed in the first area portion in which the user data is recorded (e.g. all or part of the user data area), and in the second area portion other than the first area portion (e.g. the buffer area, such as a lead-in area, a lead-out area, and a middle area). By this, it is possible to receive the above-mentioned various benefits while effectively using the flag bit substantially on the entire information recording medium.

In another aspect of the information recording apparatus of the present invention, the information recording medium is provided with a first recording layer and a second recording layer, each provided with the user data area.

According to this aspect, even if the user data or the like is recorded onto the information recording medium provided with a plurality of recording layers, it is possible to receive the above-mentioned various benefits.

(Information Recording Method)

The above object of the present invention can be also achieved by an information recording method provided with: a first recording process of recording user data into a user data area provided for an information recording medium, with a data area attribute added, the data area attribute indicating that the user data is recorded; and a second recording process of recording a marker following an end edge portion of the recorded user data, with a predetermined flag bit set to a first value and with the data area attribute added, the marker indicating that a position of the marker is the end edge portion of the recorded user data, the flag bit indicating at least whether or not the marker is recorded.

According to the information recording method of the present invention, it is possible to receive the same various benefits as those of the above-mentioned information recording apparatus of the present invention.

Incidentally, in response to the various aspects of the above-mentioned information recording apparatus of the present invention, the information recording method of the present invention can also adopt various aspects.

(Computer Program)

The above object of the present invention can be also achieved by a computer program for recording control to control a computer provided for the above-mentioned information recording apparatus (including its various aspects), the computer program making the computer function as at least one portion of the first recording device and the second recording device.

According to the computer program of the present invention, the above-mentioned information recording apparatus of the present invention can be embodied relatively readily, by loading the computer program from a recording medium for storing the computer program, such as a ROM, a CD-ROM, a DVD-ROM, a hard disk or the like, into the computer, or by downloading the computer program, which may be a carrier wave, into the computer via a communication device.

Incidentally, in response to the various aspects of the above-mentioned information recording apparatus of the present invention, the computer program of the present invention can adopt various aspects.

The above object of the present invention can be also achieved by a computer program product in a computer-readable medium for tangibly embodying a program of instructions executable by a computer, the computer program product making the computer function as at least one portion of the first recording device and the second recording device.

According to the computer program product of the present invention, the aforementioned information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned information recording apparatus of the present invention.

(Information Recording Medium)

The above object of the present invention can be also achieved by an information recording medium provided with a user data area in which user data is recorded, wherein a marker being recorded following an end edge portion of the recorded user data, with a predetermined flag bit set to a first value and with the data area attribute added, the marker indicating that a position of the marker is the end edge portion of the recorded user data, the flag bit indicating at least whether or not the marker is recorded.

According to the information recording medium of the present invention, it is possible to receive the same various benefits as those of the information recording apparatus of the present invention.

Incidentally, in response to the various aspects of the above-mentioned information recording apparatus of the present invention, the information recording medium of the present invention can adopt various aspects.

These effects and other advantages of the present invention will become more apparent from the embodiments explained below.

As explained above, according to the information recording apparatus of the present invention, it is provided with the first recording device and the second recording device. According to the information recording method of the present invention, it is provided with the first recording process and the second recording process. According to the computer-readable recording medium of the present invention, it makes a computer function as at least one portion of the first recording device and the second recording device. According to the information recording medium of the present invention, the marker is recorded following the end edge portion of the recorded user data, with the predetermined flag bit set to the first value and with the data area attribute added. Therefore, it is possible to maintain the preferable recording operation and the preferable reproduction operation while the marker, such as an intermediate marker, for example, is recorded.

BRIEF DESCRIPTION OF DRAWINGS

FIG. 1 are a substantial plan view showing the basic structure of an optical disc in an embodiment of the present invention, and a schematic cross sectional view showing the optical disc and its corresponding schematic conceptual view showing a recording area structure in the radial direction.

FIG. 2 is a schematic cross sectional view showing the optical disc and its corresponding schematic conceptual view showing the recording area structure in the radial direction.

FIG. 3 are an explanatory diagram conceptually showing the data structure of the optical disc after a normal format process is performed thereon, and an explanatory diagram conceptually showing the data structure of the optical disc after a quick format process is performed thereon.

FIG. 4 is a view conceptually showing transition in states of the optical disc.

FIG. 5 is a data structure diagram conceptually showing the data structure related to an attribute added when data is recorded.

FIG. 6 is a data structure diagram conceptually showing the data structure of RMD recorded into RMA.

FIG. 7 is a data structure diagram conceptually showing the data structure of each of fields constituting the RMD with regard to a format 2 and a format 3.

FIG. 8 is a data structure diagram showing the data structure of a field 0 of the RMD of the format 3.

FIG. 9 is a data structure diagram showing the data structure of a field 3 of the RMD of the format 3.

FIG. 10 is a block diagram conceptually showing the basis structure of an information recording/reproducing apparatus in an embodiment of the present invention.

FIG. 11 is an explanatory diagram conceptually showing one data structure on the optical disc when user data is recorded by the operation of the information recording/reproducing apparatus in the embodiment, in association with the area structure of the optical disc.

FIG. 12 is an explanatory diagram conceptually showing a data structure on the optical disc when user data is recorded by the operation of the information recording/reproducing apparatus in a comparison example, in association with the area structure of the optical disc.

FIG. 13 is an explanatory diagram conceptually showing another data structure on the optical disc when user data is recorded by the operation of the information recording/reproducing apparatus in the embodiment, in association with the area structure of the optical disc.

FIG. 14 is an explanatory diagram conceptually showing another data structure on the optical disc when user data is recorded by the operation of the information recording/reproducing apparatus in the embodiment, in association with the area structure of the optical disc.

FIG. 15 is an explanatory diagram showing one procedure of the specific recording operation of the user data, performed by the information recording/reproducing apparatus in the embodiment, in association with the area structure of the optical disc.

FIG. 16 is an explanatory diagram showing another procedure of the specific recording operation of the user data, performed by the information recording/reproducing apparatus in the embodiment, in association with the area structure of the optical disc.

FIG. 17 is an explanatory diagram showing another procedure of the specific recording operation of the user data, performed by the information recording/reproducing apparatus in the embodiment, in association with the area structure of the optical disc.

FIG. 18 is an explanatory diagram showing one procedure of the specific recording operation of the user data, performed by the information recording/reproducing apparatus in the embodiment, in association with the area structure of the optical disc.

DESCRIPTION OF REFERENCE CODES

100 optical disc
102 lead-in area
105, 115 user data area
106, 116 shifted middle area
108 intermediate marker
109, 119 fixed middle area
118 lead-out area
200 information recording/reproducing apparatus
300 disc drive
352 optical pickup
353 signal recording/reproducing device
354, 359 CPU
400 host computer

BEST MODE FOR CARRYING OUT THE INVENTION

Hereinafter, the best mode for carrying out the invention will be explained in order in each embodiment with reference to the drawings.

(Information Recording Medium)

Firstly, with reference to FIG. 1, an optical disc 100 will be explained as an embodiment of the information recording medium of the present invention. FIG. 1(*a*) is a substantial plan view showing the basic structure of the optical disc 100 in the embodiment, and FIG. 1(*b*) is a schematic cross sectional view showing the optical disc 100 and its corresponding schematic conceptual view showing a recording area structure in the radial direction.

As shown in FIG. 1(*a*) and FIG. 1(*b*), the optical disc 100 has a recording surface on a disc main body with a diameter of about 12 cm, as is a DVD. On the recording surface, the optical disc 100 is provided with: a center hole 101 as the center; a lead-in area 102 or a lead-out area 118; user data areas 105 and 115; and fixed middle areas 109 and 119. Then, the optical disc 100 has recording layers or the like laminated on a transparent substrate 110. In each recording area of the recording layers, a track or tracks, such as groove tracks and land tracks, are alternately placed, spirally or concentrically, centered on the center hole 101, for example. On the track, data is divided and recorded by a unit of ECC block. The ECC block is a data management unit by which record information is error-correctable.

Incidentally, the present invention is not particularly limited to the optical disc having these three areas. For example, even if the lead-in area 102, the lead-out area 118 or the fixed middle area 109 (119) does not exist, a data structure explained below can be constructed. Moreover, as described later, the lead-in area 102, the lead-out area 118 or the fixed middle area 109 (119) may be further segmentalized.

In particular, the optical disc 100 in the embodiment, as shown in FIG. 1(*b*), has such a structure that an L0 layer and an L1 layer, which constitute one example of the "first and second record layers" of the present invention descried later, respectively, are laminated on the transparent substrate 110. Upon the recording/reproduction of such a two-layer type optical disc 100, the recording/reproduction of various data in the L0 layer or the recording/reproduction of various data in the L1 layer is performed, depending on which recording layer has the focus position of laser light LB, irradiated from the lower side to the upper side in FIG. 1(*b*). Particularly in the L0 layer, the various data is recorded from the inner circumferential side to the outer circumferential side, whereas in the L1 layer, the various data is recorded from the outer circumferential side to the inner circumferential side. Namely, the optical disc 100 in the embodiment corresponds to an optical disc of an opposite track path type. However, even an optical disc of a parallel track path type can receive various benefits described below by adopting the following structure which will be explained.

Moreover, the optical disc 100 in the embodiment is provided with a RMA (Recording Management Area) 103 (113) on the inner circumferential side of the lead-in area 102 and the lead-out area 118.

The RMA 103 (113) is a recording area to record therein RMD (Recording Management Data) for managing the recording of the data onto the optical disc 100. The more specific data structure of the RMD will be described in detail later (refer to FIG. 6 to FIG. 9).

Moreover, the optical disc 100 in the embodiment is constructed to record the data a plurality of times into the same area portion, as in a DVD-RW, for example. Specifically, a recording film provided for each of the L0 layer and the L1 layer includes a phase change film, for example. The phase change film transits between a crystalline state and a non-crystalline state (amorphous state), which realizes the plurality of times of data recording.

Moreover, the optical disc 100 in the embodiment adopts layer jump recording of recording the data alternately into the L0 layer and the L1 layer. Specifically explaining the layer jump recording, after the user data is recorded into a partial recording area of the user data area 105 in the L0 layer, the user data is recorded into a partial recording area of the user data area 115 in the L1 layer facing the partial recording area of the L0 layer. Then, after the user data is recorded into another partial recording area of the user data area 105 in the L0 layer, the data is recorded into another partial recording area of the user data area 115 in the L1 layer facing the another partial recording area of the L0 layer. After that, this operation is repeated.

Incidentally, a method of recording the user data onto the optical disc 100 in the embodiment is not limited to the layer jump recording. For example, it may be constructed such that after the user data is recorded into the entire user data area 105 in the L0 layer, the user data is recorded into the entire user data area 115 in the L1 layer.

Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers, or of a single layer type having one recording layer.

Incidentally, the fixed middle area 109 (119) is formed to provide compatibility between a read-only optical disc, such as a DVD-ROM, and the optical disc 100 in the embodiment, after the data is recorded into the entire user data area 105 (115). Namely, the middle area 109 (119) is formed to equalize the area structure on the two-layer type read-only optical disc and the area structure on the optical disc 100 in the embodiment.

In addition, the fixed middle area 109 (119) has a function to prevent an optical pickup from jumping to an unrecorded area (specifically on the outer circumferential side of the fixed middle area 109 (119)), in performing the layer jump to change the recording layer or in accessing near the fixed middle area 109 (119), after the user data is recorded in the entire user data area 105 (115). More specifically, if the fixed middle area 109 (119) is detected in searching the optical disc 100 while irradiating the laser light LB from the optical pickup, the optical pickup is displaced to the inner circumferential side. This can eliminate such a disadvantage that the optical pickup accesses an area portion outer than the fixed middle area 109 (119). This function is referred to a fail safe mechanism.

Moreover, as in the fixed middle area 109 (119), the lead-in area 102 and the lead-out area 118 also have a function to prevent the optical pickup from jumping to an unrecorded area (specifically on the inner circumferential side of the lead-in area 102 and the lead-out area 118), in performing the layer jump to change the recording layer or in accessing the lead-in area 102 and the lead-out area 118. More specifically, if the lead-in area 102 and the lead-out area 118 are detected in searching the optical disc 100 while irradiating the laser light LB from the optical pickup, the optical pickup is displaced to the outer circumferential side. This can eliminate such a disadvantage that the optical pickup accesses an area portion inner than the lead-in area 102 and the lead-out area 118.

Incidentally, if the user data is recorded only in one portion of the user data area 105 (115), instead of the fixed middle area 109 (119), a shifted middle area 106 (116) is used.

Now, with reference to FIG. 2, the shifted middle area 106 (116) will be explained. FIG. 2 is a schematic cross sectional view showing the optical disc and its corresponding schematic conceptual view showing the recording area structure in the radial direction.

As shown in FIG. 2, the shifted middle area 106 is disposed in the user data area 105 following the user data recorded in one portion of the user data area 105. In the same manner, the shifted middle area 116 is disposed in the user data area 115 following the user data recorded in one portion of the user data area 115.

By providing the shifted middle area 106 (116), even if the user data is recorded only in one portion of the user data area 105 (115), it is possible to provide compatibility between a read-only optical disc, such as a DVD-ROM, and the optical disc 100 in the embodiment. In addition, it is possible to prevent the optical pickup from jumping to the unrecorded area, in performing the layer jump. More specifically, if the shifted middle area 106 (116) is detected in searching the optical disc 100 while irradiating the laser light LB from the optical pickup, the optical pickup is displaced to the inner circumferential side. This can eliminate such a disadvantage that the optical pickup accesses an area portion outer than the shifted middle area 106 (116). Moreover, even if the layer jump is not performed, it is possible to prevent the optical pickup from jumping to the unrecorded area outer than the shifted middle area 106 (116). Thus, the read-only type information reproducing apparatus can reproduce the data recorded on the optical disc 100.

Namely, the shifted middle area 106 (116) has both the function of preventing the optical pickup from jumping and the function of maintaining the compatibility with the read-only type optical disc, in case that the user data is recorded only in one portion of the user data area 105 (115). In particular, if the layer jump recording is performed, the data is frequently recorded only in one portion of the user data area 105 (115). Therefore, the shifted middle area 106 (116) is efficiently used particularly in the layer jump recording.

On the other hand, the fixed middle area 109 (119) has both the function of preventing the optical pickup from jumping and the function of maintaining the compatibility with the read-only type optical disc, in case that the user data is recorded in the entire user data area 105 (115).

Into the lead-in area 102, the lead-out area 118, the fixed middle area 109 (119), and the shifted middle area 106 (116), predetermined data (e.g. various control data and padding data, such as "00h", or the like) is recorded by performing a normal format process on the optical disc 100. Moreover, in addition to the normal format process, a quick format process is performed to start the recording of the user data after only minimum necessary management information is recorded.

Now, with reference to FIG. 3 and FIG. 4, the normal format process and the quick format process will be specifically explained. FIG. 3 are an explanatory diagram conceptually showing the data structure of the optical disc 100 after the normal format process is performed thereon (FIG. 3(*a*)), and an explanatory diagram conceptually showing the data structure of the optical disc after the quick format process is performed thereon (FIG. 3(*b*)). FIG. 4 is a view conceptually showing transition in states of the optical disc 100.

As shown in FIG. 3(*a*), if the normal format process is performed, the predetermined data is recorded into the lead-in area 102 while a lead-in area attribute is added, and the predetermined data is recorded into the lead-out area 118 while the lead-out area attribute is added.

Moreover, by recording the predetermined data into the recording area, following the user data recorded in the user data area 105, with a middle area attribute added, the shifted middle area 106 is formed. In the same manner, by recording the predetermined data into the recording area, following the user data recorded in the user data area 115, with a middle area attribute added, the shifted middle area 116 is formed. Alternatively, it may be constructed to record the predetermined user data into the user data area 105 (115) while a data area attribute is added depending on a format size requested from a host computer or the like described later, and then to form the shifted middle area 106 (116) following the recorded data.

By performing the normal format process in this manner, it is possible to substantially equalize the area structure on the optical disc 100 and the area structure on the read-only optical disc. The state of the optical disc 100 shown in FIG. 3(*a*) is referred to as a "complete state".

On the other hand, as shown in FIG. 3(*b*), if the quick format process is performed, minimum necessary data (specifically, RW-Physical format information and data to be recorded on the outer circumferential side of the RW-Physical format information, in case of a DVD-RW, which is one specific example of the optical disc 100) is recorded into the lead-in area 102, with the data area attribute added. This operation corresponds to operation of logically deleting the user data recorded in the user data area 105 (115) by deleing or overwriting various management data recorded in the lead-in area 102. Moreover, the predetermined user data is recorded into the user data area 105 (or 115) if needed, with the data area attribute added, depending on the format size requested from the host computer or the like described later.

Following the recorded user data (in other words, the user data logically recorded), an intermediate marker 108 is formed which constitutes one specific example of the "marker" of the present invention. The intermediate marker 108 has a size of 32 ECC blocks and is recorded following the end edge portion of the recorded user data (specifically, the end edge portion of the area portion in which the use data is recorded, and the edge portion on the outer circumferential side in the L0 layer, or the edge portion on the inner circumferential side in the L1 layer). Therefore, if the user data is recorded into the user data area 105 (115) by an instruction of a user after the quick format process is performed, the user data is newly recorded starting from a position in which the intermediate marker 108 is recorded, so that a new intermediate marker 108 is recorded in the end edge portion of the newly recorded user data. Thus, the intermediate marker 108 indicates the end edge portion of the recorded user data and also indicates the area portion in which the user data is recorded next. Into the intermediate marker 108, the predetermined data is recorded if needed, with the data area attribute added. The state of the optical disc 100 shown in FIG. 3(*b*) is referred to as an "intermediate state". Incidentally, the specific recording aspect of the intermediate marker 108 will be explained in detail later (refer to FIG. 10 etc.).

The intermediate marker 108 is used to detect the end edge portion of the recorded user data, for example. Specifically, it can preferably recognize the boundary between the intermediate marker 108 and the already recorded user data by seeking near the intermediate marker 108 with the laser light irradiated. In particular, in case that RMD (Recording Management Data) in which the address of the end edge portion of the recorded user data area (LRA: Last Recorded Address) is recorded cannot be read due to defects or the like, the content of the RMD can be restored by using the intermediate marker. Alternatively, since the content of the RMD is not always updated in real time, it is possible to recognize the end edge portion of the already recorded user data, highly accurately, by using the intermediate marker 108.

In addition, since the end edge portion of the already recorded user data can be recognized by using the intermediate marker 108, it is unnecessary to update and record (or re-record) the LRA in real time in response to the recording of the user data. Specifically, in case of a DVD-RW, which is one specific example of the optical disc 100, there is a tolerance of approximately 4 MB as the size of the user data between the position shown by the LRA and the actual position of the end edge portion of the already recorded user data. This does not excessively reduce the lifetime of the recording film provided for each of the L0 layer and the L1 layer as it is unnecessary to frequently update and record (or re-record) the LRA (i.e. the RMD including the LRA).

Incidentally, the format size requested from the host computer or the like may be "0". In this case, the intermediate marker 108 is formed so as to be adjacent to the data recorded in the lead-in area 102 while the data area attribute is added.

By performing the quick format process, it is possible to randomly overwrite the user data into the partial recording area of the user data area 105 with the data area attribute added. More specifically, in the recording area in which the user data is not recorded (in other words, the recording area with no attribute added), it is necessary to record the user data sequentially (in other words, continuously from the inner circumferential side to the outer circumferential side in the L0 layer, and continuously from the outer circumferential side to the inner circumferential side in the L1 layer). Namely, a NWA. (Next Writable Address) indicating the recording area in which the user data can be recorded next indicates the head portion of the recording area in which the user data is not recorded, so that in the recording area outer than the NWA, it is necessary to record the user data in order (i.e. sequentially) from the recording area shown by the NWA. Incidentally, the position shown by the NWA can correspond to the start edge portion of the intermediate marker 108 (specifically, the edge portion on the inner circumferential side in case of the L0 layer, and the edge portion on the outer circumferential side in case of the L1 layer). However, in the recording area with the data area attribute added, located inner than the position shown by the NWA, it is possible to record the user data in a desired position (i.e. randomly). As described above, it can be said that the quick format process also has a function of expanding the recording area in which the user data can be recorded by updating the NWA.

Then, in the optical disc 100 on which the quick format process is performed, in contrast to the case where the normal format process is performed, all the necessary data is not recorded in the lead-in area 102 and the lead-out area 118 or the like. Therefore, after the quick format process is performed, a finalize process (or a close process) is further performed, by which various management information or various control information according to the recording aspect of the data on the optical disc 100 is recorded into the lead-in area 102 and the lead-out area 118 or the like. Moreover, the shifted middle area 106 (116) and the fixed middle area 109 (119) are formed following the recorded user data, and padding data, such as "00h" data, for example, is recorded into an unrecorded area between the lead-in area 102 and the shifted middle area 106 (or the fixed middle area 109) and an unrecorded area between the lead-out area 118 and the shifted middle area 116 (or the fixed middle area 119). By this, it is possible to reproduce the information recorded on the optical disc 100 in the embodiment, on the read-only type information reproducing apparatus.

Incidentally, depending on the size of the data to be recorded onto the optical disc 100, in some cases, the size of the data to be recorded into the L0 layer may not be equal to the size of the data to be recorded into the L1 layer. Specifically, in some cases, xGB of data may be recorded from the inner circumferential side to the outer circumferential side of the L1 layer, and the layer jump may be performed, and then, x/2 GB of data may be recorded from the outer circumferential side to the inner circumferential side of the L1 layer. In this case, in the L1 layer facing the recording area of the L0 layer in which the data is already recorded, there is the recording area in which the data is not recorded. On the other hand, from the viewpoint that the data is stably reproduced, some data needs to be recorded (in other words, it is need not to be a mirror state) in the recording area of the L1 layer facing the recording area of the L0 layer in which the data is already recorded. Therefore, in the recording area of the L1 layer which faces the recording area of the L0 layer in which the data is already recorded and in which the data is not recorded, it is necessary to record the predetermined data while the data area attribute is added. Alternatively, in the recording area of the L1 layer which faces the recording area of the L0 layer in which the data is already recorded and in which the data is not recorded, it may be constructed to record the predetermined data (i.e. padding data or the like) while the lead-out area attribute is added.

Moreover, if the quick format process of recording the predetermined user data into the shifted middle area 106 (116) or the like while the data area attribute is added is performed on the optical disc 100 in the complete state shown in FIG. 3(*a*), it is possible to record the user data again onto the optical disc 100 which once goes into the complete state. As described above, the quick format process, performed to record the user data again onto the optical disc 100 in the complete state, can be also referred to as a quick grow format process.

As shown in FIG. 4, by performing the normal format process on the blank optical disc 100 on which the data is not recorded, the state of the optical disc 100 can be transited into the complete state shown in FIG. 3(*a*). In the same manner, by performing the quick format process on the blank optical disc 100 on which the data is not recorded, the state of the optical disc 100 can be transited into the intermediate state shown in FIG. 3(*b*).

By performing the normal format process on the optical disc 100 transited into the complete state, the state of the optical disc 100 can be maintained in the complete state shown in FIG. 3(*a*). Moreover, by performing the quick format process (in other words, the quick grow format process) on the optical disc 100 transited into the complete state, the state of the optical disc 100 can be transited into the intermediate state shown in FIG. 3(*b*).

By performing the quick format process on the optical disc 100 transited into the intermediate state, the state of the optical disc 100 can be maintained in the intermediate state shown in FIG. 3(*b*). Moreover, by performing the normal format process on the optical disc 100 transited into the intermediate state, the state of the optical disc 100 can be transited into the complete state shown in FIG. 3(*a*).

Next, with reference to FIG. 5, the attribute added when the data is recorded will be specifically explained. FIG. 5 is a data structure diagram conceptually showing the data structure related to the attribute added when data is recorded.

The attribute is added to each physical sector with a size of 2418 bytes, depending on the data to be recorded into the physical sector. One physical sector is provided with: a SYNC code with a size of 52 bytes; an ECC (Error Correction Code) with a size of 302 bytes; data with a size of 2048 bytes; a data ID with a size of 4 bytes; an IED with a size of 2 bytes; a CPR_MAI with a size of 6 bytes; and an EDC with a size of 4 bytes. Then, the attribute is recorded in the data ID.

Specifically, as shown in FIG. 5, the data ID with a size of 4 bytes includes sector information with a size of 1 byte and a sector number with a size of 3 bytes.

The sector information with a size of 1 byte includes: a sector format type bit with a size of 1 bit; a tracking method bit with a size of 1 bit; a reflectivity bit with a size of 1 bit; a reserved area with a size of 1 bit; an area type bit with a size of 2 bits indicating the attribute; a data type bit with a size of 1 bit constituting one specific example of the "flag bit" of the present invention; and a layer number bit with a size of 1 bit.

The area type bit indicates the attribute of the physical sector including this area type bit. Specifically, for example, if "00b" is recorded, it indicates the physical sector has the data area attribute. If "01b" is recorded, it indicates the physical sector has the lead-in area attribute. If "10b" is recorded, it indicates the physical sector has the lead-out area attribute. If "11b" is recorded, it indicates the physical sector has the middle area attribute.

The data type bit 121 indicates the type of the data recorded in the physical sector including this data type bit 121. Specifically, for example, if "0h" is recorded, it indicates that re-recordable data is recorded in the physical sector including this data type bit 121. For example, if "1h" is recorded, it indicates that linking data to be recorded in the boundary of the recorded data is recorded in the physical sector including this data type bit 121.

Particularly in the embodiment, "1h" is recorded in the data type bit 121 included in the physical sector in which the intermediate marker 108 is recorded, in the user data area 105 (115). On the other hand, "0h" is recorded in the data type bit 121 included in the physical sector in which the user data is recorded. In other words, for example, if "0h" is recorded in the data type bit 121 in the user data area 105 (115), it indicates that the user data is recorded in the physical sector including this data type bit 121. For example, if "1h" is recorded in the data type bit 121, it indicates that the intermediate marker 108 is recorded in the physical sector including this data type bit 121. As described above, in the embodiment, the intermediate marker 108 is identified with reference to the data type bit 121.

Incidentally, in the area portion other than the area portion in which the user data and the intermediate marker 108 are recorded (specifically, the lead-in area 102, the lead-out area 118, the fixed middle area 109 (119), and the shifted middle area 106 (116) other than all or part of the user data area 105 (115)), the data type bit 121 preferably indicates that the re-recordable data is recorded or the linking data is recorded.

Next, with reference to FIG. 6 to FIG. 9, the specific data structure of the RMD recorded into the RMA 103 (113) will be explained. FIG. 6 is a data structure diagram conceptually showing the data structure of the RMD recorded into RMA 103 (113). FIG. 7 is a data structure diagram conceptually showing the data structure of each of fields constituting the RMD with regard to a format 2 and a format 3. FIG. 8 is a data structure diagram showing the data structure of a field 0 of the RMD of the format 3. FIG. 9 is a data structure diagram showing the data structure of a field 3 of the RMD of the format 3. Incidentally, in the explanation below, the RMA 103 will be explained for simplification of explanation; however, it will be obvious that the RMA 113 has the same data structure.

As shown in FIG. 6, the RMA 103 is divided into five RMA segments (#1 to #5). In each of the RMA segments (#1 to #5), 28 RMD sets (#1 to #28) can be recorded. In each of the RMD sets (#1 to #28), five RMD blocks can be recorded, each of which has a size of 32 KB. The five RMD blocks recorded in each of the RMD sets (#1 to #28) has the same content, except for one portion of the fields. In other words, the five RMD blocks indicating the same content are recorded into one RMD set redundantly. Each RMD block includes a linking loss area with a size of 2 KB and 15 fields (1 to 14) each of which has a size of 2 KB.

As shown in FIG. 7, on the optical disc 100 in the embodiment, the format2 RMD and the format3 RMD are recorded in the RMA 103. The format2 RMD has a function of pointer indicating the position of the format3 RMD which is effective (in other words, the newest). The format3 RMD actually includes information for managing the recoding of the data on the optical disc 100.

Specifically, as shown in FIG. 7, the format2 RMD includes: a linking loss area; common information; a pointer to RMD set; and a reserved area.

The format3 RMD includes: the linking loss area; common information; OPC (Optimum Power Control) related information; user specific data; recording status information; defect status bitmap; drive specific information; and disc testing area information.

The format2 RMD is recorded in the RMD set #1 at the head of each RMA segment, in order to indicate the position of the effective format3 RMD by using the pointer to RMD set. The format3 RMD is recorded in the RMD sets (#2 to #28) other than the RMD set #1 at the head of the RMA segment #1.

Specifically, if the normal format process or the quick format process is performed on the blank optical disc 100, the format3 RMD is recorded into the RMD set #2 (or the RMD sets #3 to #28), except for the RMD set #1 at the head of the RMA segment #1. Then, the format2 RMD to point a position in which the format3 RMD is recorded is recorded into the RMD set #1 at the head of the RMA segment #1.

As the recording of the data into the user data area 105 (115) progresses, the format3 RMD is updated. The format3 RMD is overwritten on the same RMD set #2 at each time of updating or in predetermined timing. It is overwritten many times, and in the end, a reading error occurs due to the overwriting beyond the upper limit of the rewriting times or scratches and dust or the like. Then, if the format3 RMD cannot be read in a plurality of RMD blocks out of the five RMD blocks included in the RMD set #2, the format3 RMD is newly recorded into the RMD set #3 other than the RMD set #2. In this case, the format2 RMD is also updated with the change of the position in which the format3 RMD is recorded, and it is overwritten on the RMD set #1. After that, such an operation is performed on the RMD sets #3 to #28. Then, if it is judged that the format3 RMD cannot be read with respect to all the RMD sets of the RMA segment #1, the format3 RMD is newly recorded into the RMD set #2 of the RMA segment #2, and the format2 RMD is newly recorded into the RMD set #1 of the RMA segment #2. After that, such an operation is performed on the RMA segments #2 to #5.

Moreover, if the format2 RMD cannot be read in a plurality of RMD blocks out of the five RMD blocks included in the RMD set #1 of the RMA segment #1, the format2 RMD and the format3 RMD are recorded by using the RMA segment #2. In this case, even if the format3 RMD can be read from any of the RMD sets #2 to #28 of the RMA segment #1, the format2 RMD and the format3 RMD are recorded by using the next RMA segment #2.

Next, as shown in FIG. 8, the common information recorded in the field 0 of the format3 RMD (i.e. the common information recorded in the field 0 of the format2 RMD) includes: a RMD format in a byte position of "0 to 1"; a disc status in a byte position of "2"; a unique disc ID in a byte positions of "4 to 21"; a copy of pre-pit information in a byte position of "22 to 85"; a start sector number of the shifted middle area in a byte position of "86 to 89"; a pre-recorded/embossed information code in a byte position of "90"; an end address of pre-recorded/embossed lead-in area in a byte position of "92 to 95"; an end address of pre-recorded/embossed middle area on L0 layer in a byte position of "96 to 99"; a start address of pre-recorded/embossed middle area on L1 layer in a byte position of "100 to 103"; a start address of pre-recorded/embossed lead-out area in a byte position of "104 to 107"; RBG information in a byte position of "128"; and reserved areas.

Next, as shown in FIG. 9, the recording status information recorded in the field 3 of the format3 RMD includes: a format operation code in a byte position of "0"; format information #1 in a byte position of "2 to 5"; format information #2 in a byte positions of "6 to 9"; a last RZone number in a byte position of "256 to 257"; a start sector number of the RZone in a byte position of "258 to 261"; an end sector number of RZone in a byte position of "262 to 265"; a LJA (Layer Jump Address on L0 layer) in a byte position of "512 to 515"; a LRA (Last Recorded Address) in a byte position of "516 to 519"; a PLJA (Previous Layer Jump Address on L0 layer) in a byte position of "520 to 523"; a jump interval in a byte position of "524 to 525"; an outermost address of the formatted area on L0 layer in a byte position of "528 to 531"; an outermost address of the innermost formatted area on L1 layer in a byte position of "532 to 535"; an outermost address of the inner most-recorded area on L1 layer in a byte position of "536 to 539"; and reserved areas.

(Information Recording/Reproducing Apparatus)

(1) Basic Structure

Next, with reference to FIG. 10, an information recording/reproducing apparatus 200 as an embodiment of the information recording apparatus of the present invention will be explained. FIG. 10 is a block diagram conceptually showing the basis structure of the information recording/reproducing apparatus 200 in the embodiment of the present invention.

Incidentally, the information recording/reproducing apparatus 200 has a function of recording the data onto the optical disc 100 and a function of reproducing the data recorded on the optical disc 100.

As shown in FIG. 10, the information recording/reproducing apparatus 200 is provided with: a disc drive 300 on which the optical disc 100 is actually loaded and the data is recorded or reproduced; and a host computer 400, such as a personal computer, for controlling the recording and reproduction of the data with respect to the disc drive.

The disc drive 300 is provided with: the optical disc 100; a spindle motor 351; an optical pickup 352; a signal recording/reproducing device 353; a CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates in accessing the optical disc 100. More specifically, the spindle motor 351 is constructed to rotate the optical disc 100 at a predetermined speed and stop, under the spindle servo provided by a not-illustrated servo unit or the like.

The optical pickup 352 is provided with a semiconductor laser apparatus and a collimator lens and an objective lens or the like, which are not illustrated, in order to perform the recording/reproducing with respect to the optical disc 100. More specifically, the optical pickup 352 irradiates the optical disc 100 with a light beam, such as a laser beam, as reading light with a first power upon reproduction, and as writing light with a second power with it modulated upon recording.

The signal recording/reproducing device 353 performs the recording/reproducing with respect to the optical disc 100 by controlling the spindle motor 351 and the optical pickup 352 under the control of the CPU 354. More specifically, the signal recording/reproducing device 353 is provided with a laser diode (LD) driver, a head amplifier, and the like. The LD driver generates a driving pulse, for example, and drives the semiconductor laser apparatus built in the optical pickup 352. The head amplifier amplifies the output signal of the optical pickup 352, i.e., the reflected light of the laser light, and outputs the amplified signal.

The memory 355 is used in the general data processing and the OPC process on the disc drive 300, including a buffer area for the record/reproduction data, an area used as an intermediate buffer when data is converted into the data that can be used on the signal recording/reproducing device 353, and the like. Moreover, the memory 355 is provided with: a Read Only Memory (ROM) area into which a program for performing an operation as a recording device, i.e., firmware is stored; a buffer for temporarily storing the record/reproduction data; a Random Access Memory (RAM) area into which a parameter required for the operation of the firmware program or the like is stored; and the like.

The CPU (drive control device) 354 is connected to the signal recording/reproducing device 353 and the memory 355 via the bus 357, and controls the entire disc drive 300 by giving instructions to various devices. In general, software or firmware for operating the CPU 354 is stored in the memory 355.

The data input/output control device 306 controls the data input/output from the outside with respect to the disc drive 300, and stores the data into or extracts it from a data buffer on the memory 355. A drive control command, which is issued from the external host computer 400 connected to the disc drive 300 via an interface, such as a SCSI (Small Computer System Interface) and an ATAPI (AT Attachment Packet Interface), is transmitted to the CPU 354 through the data input/output control device 306. Moreover, the record/reproduction data is also exchanged with the host computer 400 through the data input/output control device 306.

The operation/display control device 307 performs the reception of the operation instruction and display with respect to the host computer 400. The operation/display control device 307 sends the instruction to perform the recording or reproduction by using the operation bottom 310, to the CPU 359. The CPU 359 sends a control command to the disc drive 300 through the input/output control device 308 on the basis of the instruction information from the operation/display control device 307, to thereby control the entire disc drive 300. In the same manner, the CPU 359 can send a command of requiring the disc drive 300 to send the operational state to the host, to the disc drive 300. By this, it is possible to recognize the operational state of the disc drive 300, such as during recording and during reproduction. Thus, the CPU 359 can output the operational state of the disc drive 300, to the display panel 311, such as a fluorescent tube and a LCD, through the operation/display control device 307.

The memory 360 is an inner storage device used by the host computer 400, and is provided with: a ROM area into which a firmware program, such as BIOS (Basic Input/Output System), is stored; and a RAM area into which a parameter required for the operation of an operating system, an application program, or the like is stored; and the like. The memory 360 may be also connected to a not-illustrated external storage device, such as a hard disk, through the input/output control device 308.

One specific example in which the disc drive 300 and the host computer 400, as explained above, are used together is household equipment, such as recorder equipment for recording/reproducing a video. The recorder equipment records a video signal from a broadcast reception tuner and an external connection terminal, onto a disc, and outputs the video signal reproduced from the disc, to external display equipment, such as a television. The operation as the recorder equipment is performed by executing a program stored in the memory 360, on the CPU 359. Moreover, in another specific example, the disc drive 300 is a disc drive (hereinafter referred to as a drive, as occasion demands), and the host computer 400 is a personal computer or a workstation. The host computer 400, such as the personal computer, and the disc drive are connected to each other through the data input/output control devices 306 and 308, such as the SCSI and the ATAPI. An application, such as writing software, which is installed in the host computer 400, controls the disc drive.

(2) Operation Principle

Next, with reference to FIG. 11 to FIG. 14, the operation principle of the information recording/reproducing apparatus 200 in the embodiment will be explained. FIG. 11 is an explanatory diagram conceptually showing one data structure on the optical disc 100 when user data is recorded by the operation of the information recording/reproducing apparatus 200 in the embodiment, in association with the area structure of the optical disc 100. FIG. 12 is an explanatory diagram conceptually showing a data structure on the optical disc 200 when user data is recorded by the operation of the information recording/reproducing apparatus 200 in a comparison example, in association with the area structure of the optical disc 100. FIG. 13 is an explanatory diagram conceptually showing another data structure on the optical disc 100 when user data is recorded by the operation of the information recording/reproducing apparatus 200 in the embodiment, in association with the area structure of the optical disc 100.

FIG. 14 is an explanatory diagram conceptually showing another data structure on the optical disc 100 when user data is recorded by the operation of the information recording/reproducing apparatus 200 in the embodiment, in association with the area structure of the optical disc 100.

As shown in FIG. 11, under the control of the CPU 354 or 359, which constitutes one specific example of the "first recording device" of the present invention, the user data is recorded into the user data area 105. After that, under the control of the CPU 354 or 359, which constitutes one specific example of the "second recording device" of the present invention, the intermediate marker 108 to which the same data area attribute as the attribute added to the user data is added is recorded following the recorded user data.

The intermediate marker 108 is recorded into the area portion having 32 ECC blocks, and each ECC block has 16 physical sectors. Particularly in the embodiment, in each of the 32 ECC blocks provided for the area portion in which the intermediate marker 108 is recorded, "1h" is recorded into the data type bit 121 included in the second to the fifteenth physical sectors other than the first and sixteenth physical sectors. On the other hand, "0h" is recorded into the data type bit 121 included in the first and sixteenth physical sectors.

Incidentally, "0h" is recorded into the data type bit 121 included in the physical sector provided for the area portion in which the user data is recorded.

As described above, "1h" is recorded into the data type bit 121 included in the physical sector in which the intermediate marker 108 is recorded, and "0h" is recorded into the data type bit 121 included in the physical sector in which the user data is recorded. By this, the information recording/reproducing apparatus 200 preferably recognize whether or not the data to be recorded is the user data, and whether or not the data to be recorded is the intermediate marker 108. Thus, by using the intermediate marker 108, it is possible to preferably recognize the end edge portion of the recorded user data. Namely, in the embodiment, it is possible to distinguish the intermediate marker 108 and the user data by using the data type bit 121. As a result, the intermediate marker 108 recorded by the information recording/reproducing apparatus 200 in the embodiment can preferably fulfill the function as the intermediate marker 108.

Moreover, the same data area attribute as the attribute of the user data is added to the intermediate marker 108, so that there is no more possibility to misunderstand that the intermediate marker 108 is the lead-out area 118 or the like by detecting the intermediate marker 108, while the function as the intermediate marker 108 is preferably fulfilled.

Now, an explanation will be given for a comparison example in which the area type bit is used in order to distinguish the intermediate marker 108 and the user data. As shown in FIG. 12, in the comparison example, the intermediate marker 108 is recorded into the end edge portion of the recorded user data, with the lead-out area attribute added. Namely, in the user data area 105 (115), there is the intermediate marker 108 with the lead-out area attribute added. At this time, the read-only type information reproducing apparatus for reproducing the user data recorded on the optical disc 100 operates the fail-safe mechanism of getting out of a buffer area if detecting the buffer area, such as the lead-in area 102, the lead-out area 118, the fixed middle area 109 (119), and the shifted middle area 106 (116), in the middle of searching on the optical disc 100. For this, the intermediate marker 108 is recognized as the lead-out area 118, so that the disadvantage such that the user data recorded on the optical disc 100 cannot be reproduced preferably could happen.

In particular, if the above-mentioned quick format process is performed a plurality of times, the plurality of intermediate markers 108 (specifically, the old intermediate marker 108 recorded before the quick format process, and the new intermediate marker 108 newly recorded after the quick format process) can exist on the optical disc 100. In this case, the above-mentioned disadvantage can be more apparent.

However, according to the embodiment, as shown in FIG. 13, the intermediate marker 108 is recorded while the data area attribute is added, so that it eliminates a possibility to misunderstand such that the intermediate marker 108 is the lead-out area 118. By this, there is not a disadvantage that the fail-safe mechanism is mistakenly operated in the user data area 105 (115). In other words, the read-only type information reproducing apparatus can preferably operate the fail-safe mechanism by using the lead-in area 102, the lead-out area 118, the fixed middle area 109 1(119), and the shifted middle area 106 (116). Moreover, the data type bit 121 is not read by the read-only type information reproducing apparatus (in other words, it is an unreadable bit). Thus, even if the intermediate marker 108 is recorded in the user data area 105 (115), it does not influence the reproduction of the user data.

As described above, since the attribute other than the data area attribute is not added to the intermediate marker 108, even if the intermediate marker 108 is recorded in the user data area 105 (115), it is possible to preferably avoid the disadvantage that an unexpected operation is performed by detecting the intermediate marker 108. Yet, the information recording/reproducing apparatus 200 capable of recording the user data onto the optical disc 100 can preferably recognize the intermediate marker 108 by referring to the data type bit 121. As a result, even if the RMD cannot be read due to the defects or the like, it is possible to receive such a great advantage that the content of the RMD (more specifically, the LRA or the like) can be certainly restored, by using the intermediate marker 108.

Moreover, even if the plurality of intermediate markers 108 exist on the optical disc 100, it is possible to preferably avoid the disadvantage that an unexpected operation is performed by detecting the intermediate marker 108. Thus, it is also possible to receive such an advantage that it is unnecessary to delete the intermediate marker 108 at each time of the quick format process, for example. This leads to the advantage that the operation load of the information recording/reproducing apparatus 200 can be reduced. Moreover, the advantage that it is unnecessary to delete the intermediate marker 108 is the advantage that can be received when the intermediate marker 108 is unexpectedly left on the optical disc 100 due to an abnormal operation (e.g. power shutdown, etc.) which can occur on the information recording/reproducing apparatus 200.

Consequently, according to the embodiment, it is possible to maintain the preferable recording operation and the preferable reproduction operation while the intermediate marker 108 is recorded, for example.

Incidentally, in the embodiment explained by using FIG. 11, "1h" is recorded into the data type bit 121 included in the second to fifteenth physical sectors, and "0h" is recorded into the data type bit 121 included in the first and sixteenth physical sectors. However, as shown in FIG. 14, it may be constructed to record "1h" into the data type bit 121 included in all the physical sectors (i.e. the first to sixteenth physical sectors) in each of the 32 ECC blocks provided for the area portion in which the intermediate marker 108 is recorded. Even such construction can receive the above-mentioned various benefits.

However, some information recording/reproducing apparatus currently distributed in the market only refers to the data type bit 121 included in the second to fifteenth physical sectors, out of each ECC block, and does not refer to the data type bit 121 included in the first to sixteenth physical sectors. Therefore, in order to make such an information recording/reproducing apparatus receive the above-mentioned benefits, preferably, "1h" is recorded into the data type bit 121 included in the second to fifteenth physical sectors, and "0h" is recorded into the data type bit 121 included in the first and sixteenth physical sectors, in each of the 32 ECC blocks provided for the area portion in which the intermediate marker 108 is recorded.

In addition, obviously, it may be constructed such that, in each of the 32 ECC blocks provided for the area portion in which the intermediate marker 108 is recorded, "1h" is recorded into the data type bit 121 included in the n physical sectors (wherein $1 \leq n \leq 16$), and "0h" is recorded into the data type bit 121 included in the (16-n) physical sectors other than the above-mentioned n physical sectors. In short, it is only necessary to distinguish the user data in which "0h" is recorded into the data type bit 121 and the intermediate marker 108 by referring to the data type bit 121. Thus, an aspect of selecting the physical sector in which "1h" is recorded into the data type bit 121, from the plurality of physical sectors in which the intermediate marker 108 is recorded, is not limited to the above-mentioned one.

(3) Specific Aspect of Recording User Data

Next, with reference to FIG. 15 to FIG. 18, the specific aspect of the recording operation of recording the user data, performed by the information recording/reproducing apparatus 200 in the embodiment, will be explained. FIG. 15 is an explanatory diagram showing one procedure of the specific recording operation of the user data, performed by the information recording/reproducing apparatus 200 in the embodiment, in association with the area structure of the optical disc 100. FIG. 16 is an explanatory diagram showing another procedure of the specific recording operation of the user data, performed by the information recording/reproducing apparatus 200 in the embodiment, in association with the area structure of the optical disc 100. FIG. 17 is an explanatory diagram showing another procedure of the specific recording operation of the user data, performed by the information recording/reproducing apparatus 200 in the embodiment, in association with the area structure of the optical disc 100. FIG. 18 is an explanatory diagram showing one procedure of the specific recording operation of the user data, performed by the information recording/reproducing apparatus 200 in the embodiment, in association with the area structure of the optical disc 100.

As shown in FIG. 15, firstly, the normal format process whose format size is equal to the size of the user data area 105 (115) is performed on the blank optical disc 100.

Then, the quick format process is performed on the optical disc 100 in the state shown in FIG. 15. By this, as shown in FIG. 16, the predetermined data is recorded into one portion of the lead-in area 102, and the intermediate marker 108 is recorded into the edge portion on the inner circumferential side of the user data area 105. The physical address (PSN: Physical Sector Number) of the edge portion on the inner circumferential side of the user data area 105 is expressed by "30000h".

More specifically, in performing the quick format process, "13h" indicating that the optical disc 100 is in the intermediate state (more specifically, a last border area is in the intermediate state of a restricted overwrite mode) is recorded in the disc status (refer to FIG. 8) included in the RMD recorded in the RMA 103 (113). Moreover, "30000h" is recorded in the start sector number (refer to FIG. 9) of RZone, "30000h" is recorded in the end sector number (refer to FIG. 9) of Rzone, "0h" is recorded in the LRA (refer to FIG. 9), and "0h" is recorded in each of the LJA and the PLJA (refer to FIG. 9).

As described above, the quick format process is the operation of logically deleting the data recorded on the optical disc 100, by updating the RMD for managing the data recorded on the optical disc 100. Thus, as shown in FIG. 16, even after the quick format process is performed, the predetermined data, which is logically deleted, is recorded physically (i.e. as a record mark or a record pit) on the entire optical disc 100.

Then, the predetermined user data is recorded on the optical disc 100 in the state shown in FIG. 16. For example, as shown in FIG. 17, 1 GB of user data is recorded into the area portion of the L0 layer expressed by the physical addresses of "30000h" to "3FFFFh", and then, after the layer jump is performed, 0.5 GB of user data is recorded into the area portion of the L1 layer expressed by the physical addresses of "4FF80h" to "57F7Fh". Then, following the user data recorded in the L1 layer, the intermediate marker 108 is recorded.

At this time, "57F7Fh" is recorded into each of the LRA and the end sector number of RZone included in the RMD recorded in the RMA 103 (113). Moreover, "0h" is recorded into each of the LJA and the PLJA.

Moreover, a compatibility process (or a close process or a finalize process) is performed on the optical disc 100 in the state shown in FIG. 17. As a result, as shown in FIG. 18, the shifted middle area 106 (116) is formed following the user data recorded in each of the L0 layer and the L1 layer.

In performing the compatibility process, "12h" indicating that the optical disc 100 is in the complete state (more specifically, the optical disc 100 is in the restricted overwrite mode) is recorded into the disc status included in the RMD recorded in the RMA 103 (113). Moreover, "8.54 GB (more specifically, the address of the end edge portion of the user data when the 8.54 GB of user data is recorded onto the optical disc 100)" is recorded in the end sector number of RZone, and "0h" is recorded in the LRA (refer to FIG. 9). In addition, "8.54 GB (more specifically, the address of the end edge portion of the user data when the 8.54 GB of user data is recorded onto the optical disc 100)" is recorded in a end PSN of data area included in RW-format physical information recorded in the lead-in area 102, and "47FC0hh" is recorded in the PSN of middle area.

At this time, the optical disc 100 is in such a condition that the predetermined data is physically recorded on the entire surface. Therefore, it is unnecessary to record padding data or the like in the compatibility process. Moreover, as described above, it is unnecessary to delete the intermediate marker 108. Thus, it is possible to relatively reduce a time length required for the compatibility process.

Incidentally, in the above-mentioned embodiments, the optical disc 100 is explained as one example of the information recording medium, and the recorder related to the optical disc 100 is explained as one example of the information recording apparatus. The present invention, however, is not limited to the optical disc and the recorder thereof, and can be applied to other various information recording media which support high-density recording or a high transfer rate, and recorders thereof.

The present invention is not limited to the aforementioned embodiment, but various changes may be made, if desired, without departing from the essence or spirit of the invention which can be read from the claims and the entire specification. An information recording medium, an information recording apparatus and method, and a computer program, all of which involve such changes, are also intended to be within the technical scope of the present invention.

INDUSTRIAL APPLICABILITY

The information recording apparatus and method, the computer program, and the information recording medium according to the present invention can be applied to an information recording medium, such as a DVD, and further to an information recording apparatus, such as a DVD recorder. Moreover, they can be applied to an information recording apparatus or the like which is mounted on various computer equipment for consumer use or for commercial use, or which can be connected to various computer equipment.

The invention claimed is:

1. An information recording apparatus comprising:
    a first recording device for recording user data into a user data area provided for an information recording medium, with a data area attribute added, the data area attribute indicating that the user data is recorded; and
    a second recording device for recording a marker following an end edge portion of the recorded user data, with a predetermined flag bit set to a first value and with the data area attribute added, for each recording of the user data by said first recording device,
    the marker indicating that a position of the marker is the end edge portion of the recorded user data,
    the flag bit indicating at least whether or not the marker is recorded.

2. The information recording apparatus according to claim 1, wherein
    the marker indicates that the position of the marker is an area portion in which the recording of the user data is to be started, in addition to indicate that the position of the marker is the end edge portion of the recorded user data.

3. The information recording apparatus according to claim 1, wherein
    the marker includes a plurality of unit blocks each of which includes a plurality of unit sectors,
    the data area attribute is added to each of the plurality of unit sectors,
    the flag bit is provided for each of the plurality of unit sectors, and
    said second recording device records the marker in which the flag bit provided for at least one portion of the plurality of unit sectors is set to the first value.

4. The information recording apparatus according to claim 3, wherein said second recording device records the marker in which the flag bit provided for a unit sector located in each of a start edge portion and an end edge portion of each of the plurality of unit blocks, out of the plurality of unit sectors, is set to a second value different from the first value and in which the flag bit provided for a unit sector other than the unit sector located in each of the start edge portion and the end edge portion of each of the plurality of unit blocks is set to the first value.

5. The information recording apparatus according to claim 1, wherein
    the marker includes a plurality of unit blocks each of which includes a plurality of unit sectors,
    the data area attribute is added to each of the plurality of unit sectors,
    the flag bit is provided for each of the plurality of unit sectors, and
    said second recording device records the marker in which the flag bit provided for each of the plurality of unit sectors is set to the first value.

6. The information recording apparatus according to claim 1, wherein. said first recording device records the user data in which the flag bit is set to a second value different from the first value.

7. The information recording apparatus according to claim 1, wherein the flag bit can be read by the information recording apparatus, and the flag bit cannot be read by a read-only type information reproducing apparatus for reproducing the user data recorded on the information recording medium or the flag bit is disregarded even if the flag bit is read.

8. The information recording apparatus according to claim 1, wherein the flag bit is a data type bit indicating at least whether or not linking data is recorded.

9. The information recording apparatus according to claim 1, wherein
    in a first area portion in which the user data is recorded, the flag bit indicates whether or not a position of the flag bit is the end edge portion of the user data, and
    in a second area portion other than the first area portion in which the user data is recorded, the flag bit indicates whether or not linking data is recorded.

10. The information recording apparatus according to claim 1, wherein the information recording medium comprises a first recording layer and a second recording layer, each comprising the user data area.

11. An information recording method comprising:
    a first recording process of recording user data into a user data area provided for an information recording medium, with a data area attribute added, the data area attribute indicating that the user data is recorded; and
    a second recording process of recording a marker following an end edge portion of the recorded user data, with a predetermined flag bit set to a first value and with the data area attribute added, for each recording of the user data by said first recording process,
    the marker indicating that a position of the marker is the end edge portion of the recorded user data,
    the flag bit indicating at least whether or not the marker is recorded.

12. A computer program product in a computer-readable medium for tangibly embodying a program of instructions executable by a computer provided for said information recording apparatus according to claim 1, said computer program making the computer function as at least one portion of said first recording device and said second recording device.

13. An information recording medium comprising a user data area in which user data is recorded, wherein
    a marker being recorded following an end edge portion of the recorded user data, with a predetermined flag bit set to a first value and with the data area attribute added, for each recording of the user data,
    the marker indicating that a position of the marker is the end edge portion of the recorded user data,
    the flag bit indicating at least whether or not the marker is recorded.

* * * * *